US010851982B2

(12) United States Patent
Volohovs

(10) Patent No.: US 10,851,982 B2
(45) Date of Patent: Dec. 1, 2020

(54) LIGHTING DEVICE

(71) Applicant: Dmitrijs Volohovs, Riga (LV)

(72) Inventor: Dmitrijs Volohovs, Riga (LV)

( * ) Notice: Subject to any disclaimer, the term of this patent is extended or adjusted under 35 U.S.C. 154(b) by 0 days.

(21) Appl. No.: 16/816,835

(22) Filed: Mar. 12, 2020

(65) Prior Publication Data

US 2020/0309360 A1 Oct. 1, 2020

(30) Foreign Application Priority Data

Mar. 27, 2019 (EP) ..................................... 19165391

(51) Int. Cl.
| | |
|---|---|
| *F21V 23/04* | (2006.01) |
| *G01B 21/22* | (2006.01) |
| *F21V 25/02* | (2006.01) |
| *F21V 21/16* | (2006.01) |
| *H05B 45/10* | (2020.01) |
| *H05B 45/37* | (2020.01) |

(52) U.S. Cl.
CPC .......... *F21V 23/0485* (2013.01); *F21V 21/16* (2013.01); *F21V 25/02* (2013.01); *G01B 21/22* (2013.01)

(58) Field of Classification Search
CPC ........ H05B 45/10; H05B 45/37; H05B 45/20; H05B 45/46; H05B 47/18; H05B 47/19; H05B 45/00; H05B 47/105; H05B 47/185; H05B 45/14; H05B 47/11

USPC .......................... 315/171, 185 S, 197, 200 R
See application file for complete search history.

(56) References Cited

U.S. PATENT DOCUMENTS

| | | |
|---|---|---|
| 2013/0294067 A1 | 11/2013 | Engel-Hall et al. |
| 2015/0159812 A1* | 6/2015 | Speer .................. H05K 1/0281 362/382 |

FOREIGN PATENT DOCUMENTS

| | | |
|---|---|---|
| DE | 202016101262 U1 | 7/2017 |
| DE | 202016103453 U1 | 11/2017 |
| EP | 2466252 A1 | 6/2012 |
| EP | 2644987 A1 | 10/2013 |
| JP | 2004006208 A | 1/2004 |
| WO | 2018010664 A1 | 7/2017 |

OTHER PUBLICATIONS

EP search report for EPA 19 165 391.4 dated Oct. 28, 2019.

* cited by examiner

*Primary Examiner* — Wei (Victor) Y Chan
(74) *Attorney, Agent, or Firm* — Robert R. Deleault, Esq.; Mesmer & Deleault, PLLC

(57) ABSTRACT

A lighting device includes a flexible lighting panel, a plurality of winches coupled at different, respective locations to the flexible lighting panel, and one or more controllers configured to control the winches to raise and/or lower the flexible lighting panel at one or more of the different, respective locations to generate a wave-like movement of the flexible lighting panel.

14 Claims, 18 Drawing Sheets

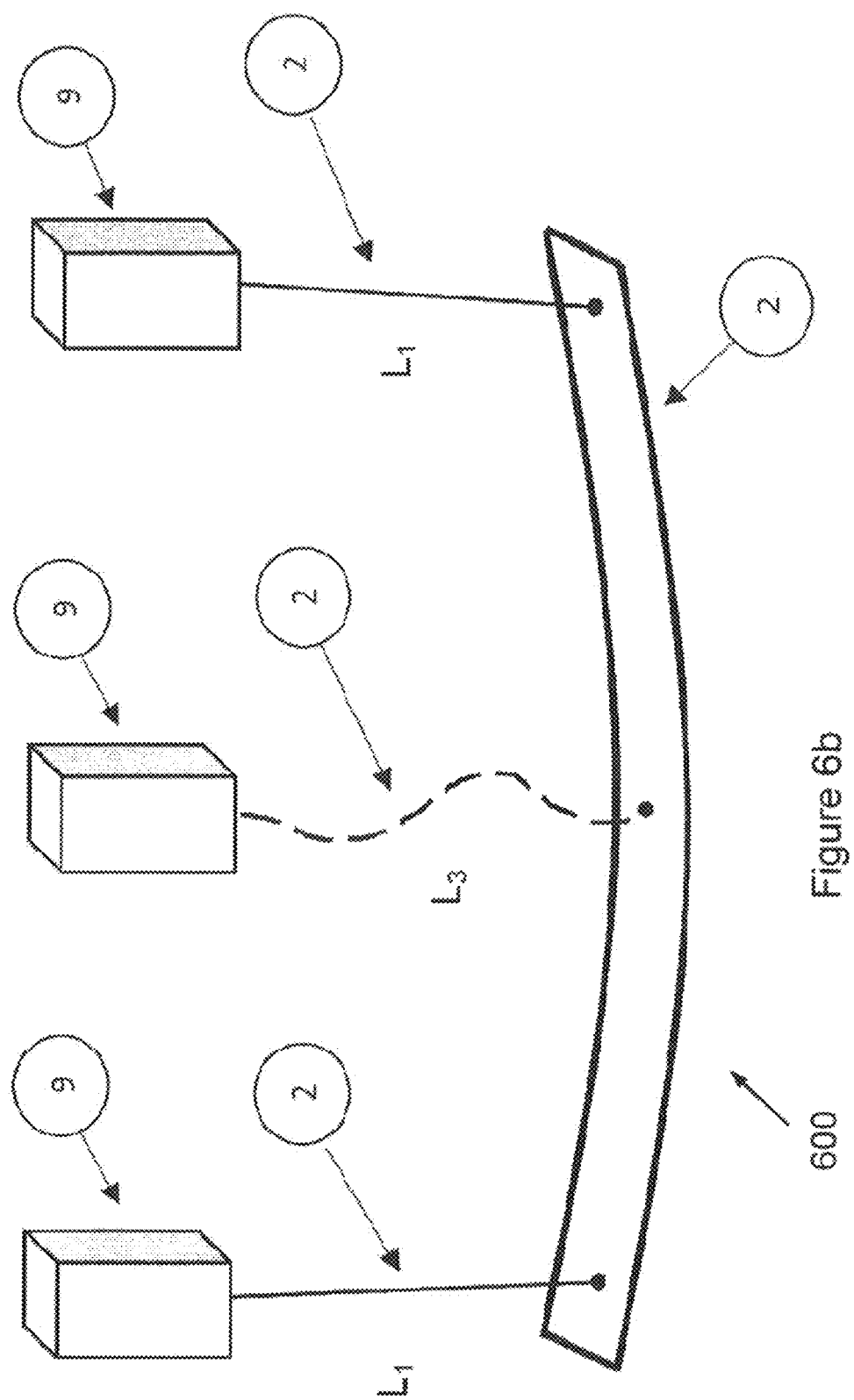

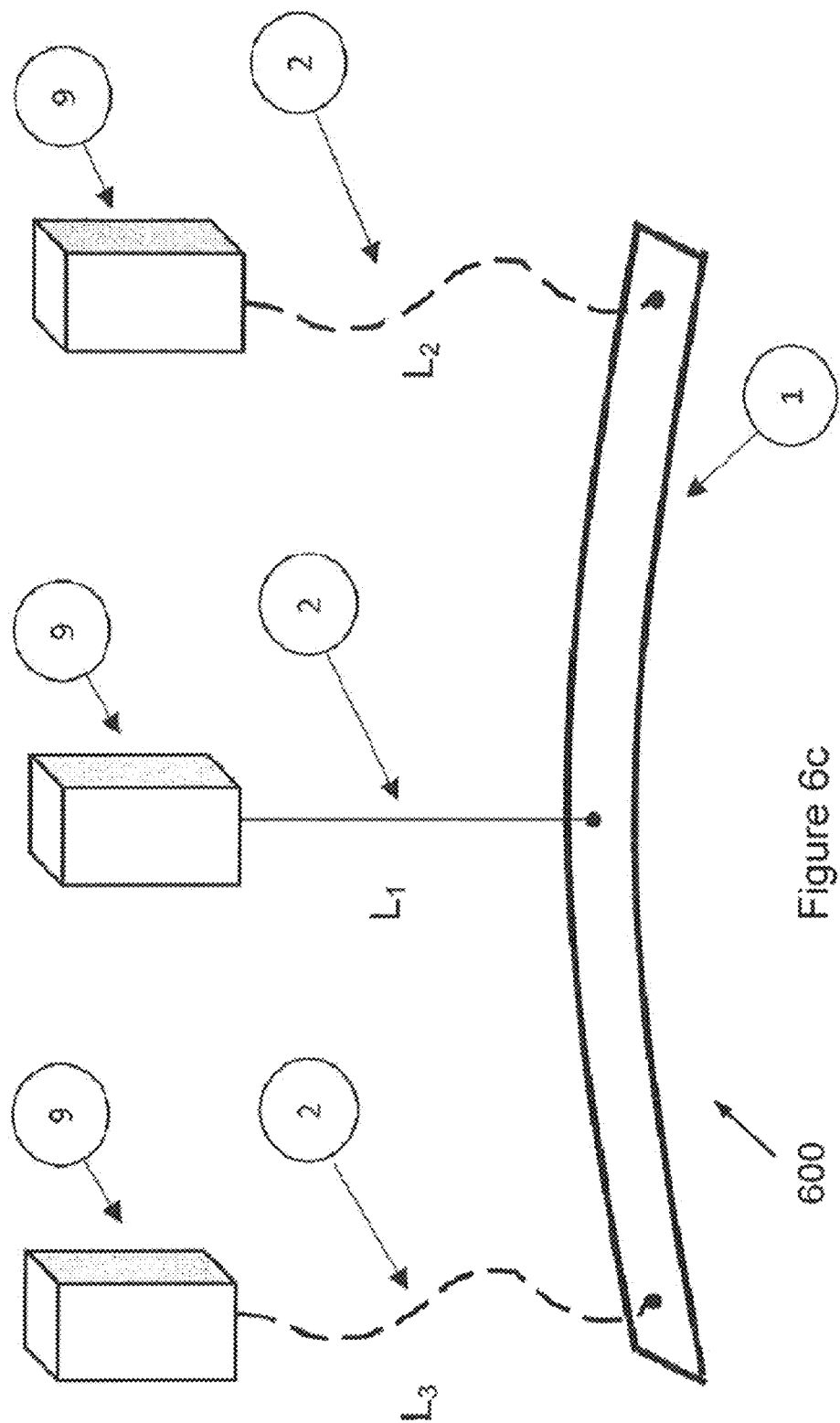

LIGHTING DEVICE

BACKGROUND OF THE INVENTION

1. Field of the Invention

The present invention relates generally to a lighting device.

2. Description of the Prior Art

Certain classes of materials, for example organic semiconductors, have been widely used in, for example, displays, lighting devices and photovoltaic devices, which allow for producing flexible electronic devices. The flexibility may hereby be constrained to some extent in view of, for example, tensile strain, compressive strain and shear stress which may occur upon bending of the flexible electronic device.

SUMMARY OF THE INVENTION

It is an object of the present disclosure to provide a flexible lighting device, where characteristics of flexibility are taken into consideration when deforming the flexible device.

A lighting device according to the present disclosure is set out in claim 1. Preferred example implementations of the lighting device are outlined in the dependent claims.

We describe a lighting device comprising: a flexible lighting panel; a plurality of winches coupled at different, respective locations to the flexible lighting panel; and one or more controllers configured to control the winches to raise and/or lower the flexible lighting panel at one or more of the different, respective locations to generate a wave-like movement of the flexible lighting panel.

It will be appreciated that the wave-like movement of the flexible lighting panel may be generated while using two winches. Using three or more winches may, in some examples, allow for more precisely conforming to a wave-like movement (that is a more precise, natural wave-like movement).

The flexible lighting panel may, in some examples, comprise a light-emitting diode panel, such as an organic light-emitting diode panel, and/or a flexible printed circuit board on which one or more light-emitting diodes (for example organic light-emitting diodes) are arranged. Other materials which allow for providing a flexible lighting panel will be known to those with skill in the art.

In some examples of the lighting device, the flexible lighting panel comprises an elongated flexible lighting panel, and wherein the different, respective locations are spaced apart from each other in a direction generally parallel to a long axis of the elongated flexible lighting panel. The wave-like movement of the flexible lighting panel may hereby be generated in the direction generally parallel to the long axis of the elongated flexible lighting panel.

In some examples of the lighting device, the flexible lighting panel is coupled to or comprises a stiffening layer configured to reduce a flexibility of the flexible lighting panel. This may be particularly advantageous since the stiffening layer may allow for increasing a bending radius which is larger than a minimum permissible radius at or below which the flexible lighting panel may suffer any damages. At the same time, however, it may be ensured that a certain flexibility of the lighting panel given a particular bending radius thereof is provided so as to control the winches using the one more controllers to raise and/or lower the flexible lighting panel at one or more of the different, respective locations to generate the wave-like movement of the flexible lighting panel.

In some examples, the stiffening layer may be arranged on one or both sides of the flexible lighting panel. Additionally or alternatively, the stiffening layer may be arranged in a middle section of the flexible lighting panel.

In some examples of the lighting device, the stiffening layer comprises one or more recesses. By providing one more recesses, in particular the recesses having a particular width which may vary from one recess to another recess, flexibility of the stiffening layer may be adjusted as desired. Due to the stiffening layer being coupled to or comprised in the flexible lighting panel, dependence of the bending radius of the flexible lighting panel in view of particular forces acting thereon may be adjusted.

In some examples of the lighting device, the stiffening layer comprises a foam. This may be particularly advantageous as the foam may, compared to other more dense, solid materials, easily withstand tension and compression, while having a larger bending radius (for particular forces acting thereon).

In some examples, the lighting device further comprises a measuring unit configured to measure a bending radius and/or bending angle of the flexible lighting panel. In some examples, the measuring unit is coupled to or comprised in one or both of the flexible lighting panel and the stiffening layer, whereby, in some examples, the stiffening layer is comprised in the flexible lighting panel.

The bending radius, which may be measured to the inside curvature, may hereby be defined as the minimum radius one may bend the flexible lighting panel without kinking it and/or damaging it and/or shortening its life-time. The smaller the bending radius, the greater is the material flexibility.

The bending angle may be defined as the angle (for example in degrees) through which the flexible lighting panel is bent.

Upon the measuring unit measuring a particular bending radius and/or bending angle of the flexible lighting panel, advantageously, certain actions may be taken so as to prevent the flexible lighting panel from being damaged. For example, a warning signal may be released, for example via the flexible lighting panel, so as to warn a user that, for example, movement or further movement of the flexible lighting panel should be prevented and/or stopped.

In some examples of the lighting device, the measuring unit is arranged within or on the stiffening layer (and/or the flexible lighting panel), and wherein the measuring unit is configured to measure a bending radius and/or bending angle of the stiffening layer, and wherein the measuring unit is configured to measure the bending radius and/or bending angle of the flexible lighting panel based on the measured bending radius and/or bending angle of the stiffening layer. The bending angle/radius of the stiffening layer may hereby be identical to the bending angle/radius of the flexible lighting panel as the stiffening layer may be arranged on or integral with the flexible lighting panel.

The measuring unit may hereby be arranged on one or both sides of the stiffening layer. Additionally or alternatively, the measuring unit may be arranged within a center part (layer) of the stiffening layer.

Via measuring the bending angle and/or bending radius of the stiffening layer, the bending angle/radius of the flexible lighting panel may be determined.

The information regarding the bending angle and/or bending radius of the stiffening layer and/or the flexible lighting panel, whereby the bending angle and/or bending radius of the flexible lighting panel may be determined from the bending angle and/or bending radius of the stiffening layer, may be used such that appropriate action may be taken as and when or before the bending radius of the flexible lighting panel may be too small and/or the bending angle of the flexing lighting panel may be too large. This may advantageously allow for preventing the flexible lighting panel from being damaged.

In some examples of the lighting device, the measuring unit comprises a sensor configured to measure the bending radius and/or bending angle based on the sensor changing its resistance and/or an output voltage depending on a bending angle of the sensor.

The sensor may hereby comprise a flex sensor. In some examples, the sensor may comprise a conductive ink-based sensor, a fiber-optic sensor, a capacitive sensor, or a combination thereof.

Using a sensor configured to measure the bending radius and/or bending angle based on the sensor changing its resistance and/or an output voltage depending on a bending angle of the sensor may be particularly advantageous as the sensor may be arranged in the lighting device in a layered structure on and/or within the stiffening layer and/or the flexible lighting panel. The sensor may hereby not prevent the flexible lighting panel from performing the wave-like movement. At the same time, the lighting device may be provided in a compact, layered structure.

In some examples of the lighting device, the measuring unit is in communication with the one or more controllers for communicating the bending radius (and/or bending angle) of the flexible lighting panel to the one or more controllers, and wherein, when the bending radius (and/or bending angle) of the flexible lighting panel is at a specific value or within a specific range of values, the one or more controllers are configured to (i) adjust a position of one or more of the winches, and/or (ii) stop and/or prevent starting said movement of the flexible lighting panel.

The communication between the measuring unit and the one more controllers may hereby relate to a wired (for example via one or more ropes of respective winches) and/or a wireless communication.

The communication between the measuring unit and the one more controllers may hereby advantageously allow for ensuring that the bending radius and/or the bending angle of the flexible lighting panel may be prevented from having a specific value or being within a specific range so as to avoid the flexible lighting panel from being damaged.

In some examples, the lighting device further comprises a plurality of weights, wherein each of the weights is arranged at an end portion of a rope of a corresponding, respective one of said winches, wherein a said winch is coupled to the flexible lighting panel via a said end portion of the corresponding, respective rope. In some examples, the weights may be rotatably attached to the flexible lighting panel.

The weights of the winch ropes and/or the flexible lighting panel itself may not be enough in order to bend the flexible lighting panel and other layered components of the lighting device coupled to the flexible lighting panel to a desired radius. Providing additional weights may advantageously allow for ensuring that the flexible lighting panel is bent to the desired radius.

In some examples of the lighting device, the one or more controllers are configured to perform a setup process for each of the winches based on a position of two or more of the winches. The setup process may hereby be used when the lighting device is being started. It may hereby be ensured that the flexible lighting panel is in a flat position, in particular before providing the wave-like movement of the flexible lighting panel. This may allow guaranteeing that the flexible lighting panel is not damaged during the bending process of the wave-like movement in view of the known, initial flat position of the flexible lighting panel.

In some examples of the lighting device, the one or more controllers are further configured to perform the setup process only when the bending angle is zero and/or when the flexible lighting panel is in a horizontal position. In some examples, multiple sensors or measuring units are being used and the bending angle may need to be zero for all sensors/measuring units. The setup process, which may also involve setting a vertical position of the flexible lighting panel, may, in some examples, be performable only when the flexible lighting panel is in a flat configuration.

In some examples, the one more controllers are configured to perform the setup process automatically upon powering on of one of more of the winches. Damaging of the flexible lighting panel based on the wave-like movement thereof may hereby be prevented in view of a defined starting position of the flexible lighting panel before starting the wave-like movement.

In some examples, the lighting device further comprises a safety control device coupled to the plurality of winches and the one or more controllers, wherein the safety control device is configured to receive, from the winches, status data relating to one or more of a setup process status, a winch current consumption status, a winch fail status, a bending angle fail status and a bending radius fail status, and wherein, when the status data satisfies a predefined condition, the safety control device is configured to: control one or more of the winches to stop raising and/or lowering the flexible lighting panel, and/or prevent the flexible lighting panel from being raisable and/or lowerable by one or more of the winches, and/or disable and/or switch off power supply to one or more (for example all) of the winches.

The winch fail status may hereby, in some examples, relate to one or more of a motor overload of a motor of a winch, a rope slack of a rope of the winch, and an overwinding of the rope of the winch.

The bending angle fail status may hereby, in some examples, relate to the bending angle of the measuring unit (sensor) being within a specific range.

The bending radius fail status may hereby, in some examples, relate to the bending radius of the measuring unit (sensor) being within a specific range.

Using the safety control device to control one or more of the winches to stop raising and/or lowering the flexible lighting panel, and/or prevent the flexible lighting panel from being raisable and/or lowerable by one or more of the winches, and/or disable and/or switch off power supply to one or more of the winches may allow for preventing the flexible lighting panel from being damaged. This may be particularly advantageous during the setup process, during the start of which the flexible lighting panel may already be in a bent state.

In some examples of the lighting device, when the safety control device receives said status data relating to the setup process status after completion of an initial setup process, the safety control device is configured to perform one or more of said controlling, preventing and disabling. In an emergency situation, for example when a winch may restart raising or lowering the flexible lighting panel for an unknown reason (for example in relation to a setup process), one a more (for example all) winches may be switched off in order to avoid damage of the load (in particular the flexible lighting panel).

In some examples of the lighting device, the safety control device is configured to detect a number of winches upon coupling of the winches to the safety control device, and wherein the one or more controllers are configured to control the winches using data indicative of the number of winches. This information may be taken into account when controlling the winches in order to perform the wave-like movement of the flexible lighting panel and/or during the setup process, so as to ensure that the flexible lighting panel is not damaged due to deformation.

In some examples, the safety control device as described above may be implemented in a lighting device with a lighting panel which is not flexible. We therefore further describe a lighting device comprising: a lighting panel; a plurality of winches coupled at different, respective locations to the lighting panel; and one or more controllers configured to control the winches to raise and/or lower the lighting panel at one or more of the different, respective locations, wherein the lighting device further comprises a safety control device coupled to the plurality of winches and the one or more controllers, wherein the safety control device is configured to receive, from the winches, status data relating to one or more of a setup process status, a winch current consumption status, a winch fail status, a winch winding status, and wherein, when the status data satisfies a predefined condition, the safety control device is configured to: control one or more of the winches to stop raising and/or lowering the lighting panel, and/or prevent the lighting panel from being raisable and/or lowerable by one or more of the winches, and/or disable and/or switch off power supply to one or more of the winches.

In some examples of the lighting device, when the safety control device receives said status data relating to the setup process status after completion of an initial setup process, the safety control device is configured to perform one or more of said controlling, preventing and disabling. Additionally or alternatively, the safety control device is configured to detect a number of winches upon coupling of the winches to the safety control device, and wherein the one or more controllers are configured to control the winches using data indicative of the number of winches.

In some examples, the safety control device is configured to control one or more of the winches, based on winch winding status data received from the winches, to raise and/or lower the lighting panel at one or more points at which the respective winches are coupled to the lighting panel so as to bring the lighting panel, for example, into a horizontal position.

Further example implementations as described herein in which the safety control device is used are equally applicable to the lighting device with a non-flexible lighting panel.

Any example implementations as described herein in which the lighting panel is flexible may equally be applicable to the lighting device in which the lighting panel is not flexible, as applicable (i.e., this may not refer to particular implementations which are explicitly based on a flexible lighting panel).

These and other aspects of the invention will now be further described, by way of example only, with reference to the accompanying figures, where like reference numerals refer to like parts.

BRIEF DESCRIPTION OF THE DRAWINGS

FIGS. 6a to d show schematic illustrations of a lighting device according to some example implementations as described herein.

DETAILED DESCRIPTION OF THE INVENTION

Example implementations as described herein generally relate to a kinetic lighting device which comprises winches sharing a flexible load.

Figure 1A:
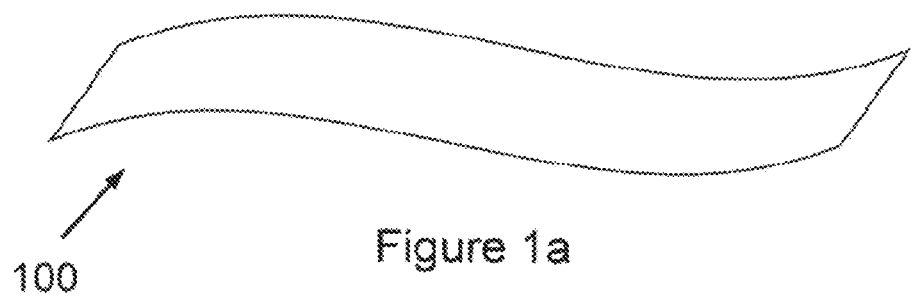
FIGS. 1a and b show schematic illustrations of flexible lighting panels according to some example implementations as described herein.
Figure 1B:
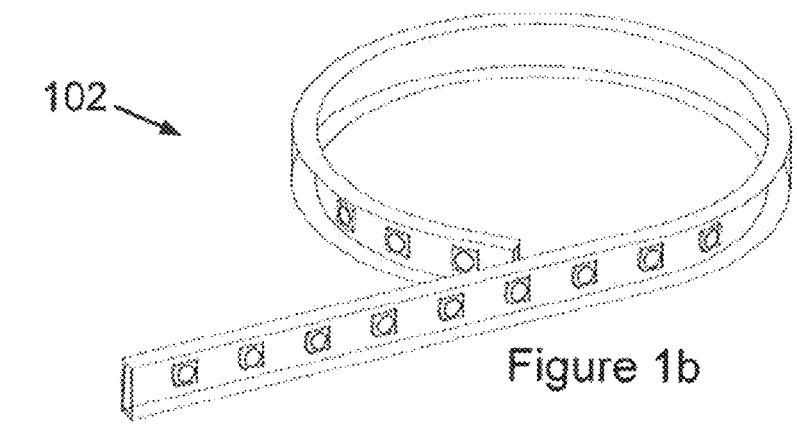

FIG. 1a shows a schematic illustration of a flexible lighting panel 100 according to some example implementations as described herein. In some examples, the flexible lighting panel may be an OLED flexible panel. Alternatively, as shown in FIG. 1b, the flexible lighting panel 102 may be a flexible PCB with LEDs (for example organic LEDs) arranged on it.

The present disclosure describes implementations of a lighting device (lamp) in which the flexible lighting panel may be moved in a wave-like manner.

The lighting device generally comprises, inter alia, a flexible lighting panel and a plurality of winches. In some examples, at least three winches are provided.

The flexible lighting panel is, in some examples, suspended at three points.

The permissible bending radius during face-in and/or face-out movement of the flexible lighting panel may hereby need to be taken into consideration. If the bending radius of the flexible lighting panel falls below the permissible bending radius, the flexible lighting panel may be damaged.

In some examples, in order to prevent the bending radius of the flexible lighting panel from falling below the permissible bending radius, an additional layer (stiffening layer) of material may be added in order to reduce flexibility of the panel. As a result, the bending radius may be increased by the stiffening layer, whereby the bending radius may be significantly larger than the minimum permissible radius below which the panel may suffer any damages.

In some examples, the stiffening layer may be a foam which may easily withstand tension and compression, but which may have a larger bending radius (for a specific force acting on it). In some examples, additionally, a measuring device is placed inside the foam layer in order to measure the bending radius of the foam layer, from which the bending radius of the flexible lighting panel may be determined.

The measuring device reports, in some examples, to a winch through its rope (or, additionally or alternatively, through a separate communications link, which may be wired or wireless, directly to a controller of the winch) if the bending angle is at a particular value. The winch may be stopped if the value is close to a limit of minimum bending radius below which damages to the devices may occur.

The addition of the stiffening layer and, in some examples, the measuring device may need to be taken into consideration when preparing the lighting device, since the weight of the winch rope of a winch and/or of the flexible lighting panel itself may not be enough in order to bend the flexible lighting panel and the stiffening layer to a desired radius. Therefore, an additional weight may be added to a rope end of a rope of the winch. This additional weight may create an additional gravity force and bend the flexible lighting panel and the stiffening layer.

As will be appreciated, adding additional weights will increase the total weight of the lighting device (lamp). It may therefore, in some examples, be required to control the winches so as to achieve a safe, coordinated movement of the flexible lighting panel. In particular, automated winches may be used in some examples, for which a safety mechanism may be put into place for a controlled movement of the flexible lighting panel.

A safety mechanism may help in potentially dangerous situations, such as a case in which one or more winches may fail (for example stop). The rest of the winches may continue to work and may damage the lighting device (lamp), and in particular the flexible lighting panel and the stiffening layer, due to a too small bending radius.

Another potentially dangerous situation may arise during an auto setup process. The auto setup process may be performed simultaneously and in a coordinated manner for all winches. If one of the winches performs the auto setup process earlier than other winches, this may damage the lamp, and in particular the flexible lighting panel and the stiffening layer, due to a too small bending radius.

Another potentially dangerous situation may occur in relation to an overload and/or a no-load situation. For example, one of the winches may go up (i.e. the flexible lighting panel is lifted by said winch), while another one or more winches go down (i.e. the flexible lighting panel is lowered by these winch or winches). The weight may hereby not be distributed equally between the winches. As a result, one of the winches may be overloaded, while others may experience no load (slack of rope or ropes).

In order to address the above potentially dangerous situations, a special winch construction and a safety controller are provided in some example implementations of the lighting device.

Figure 2:
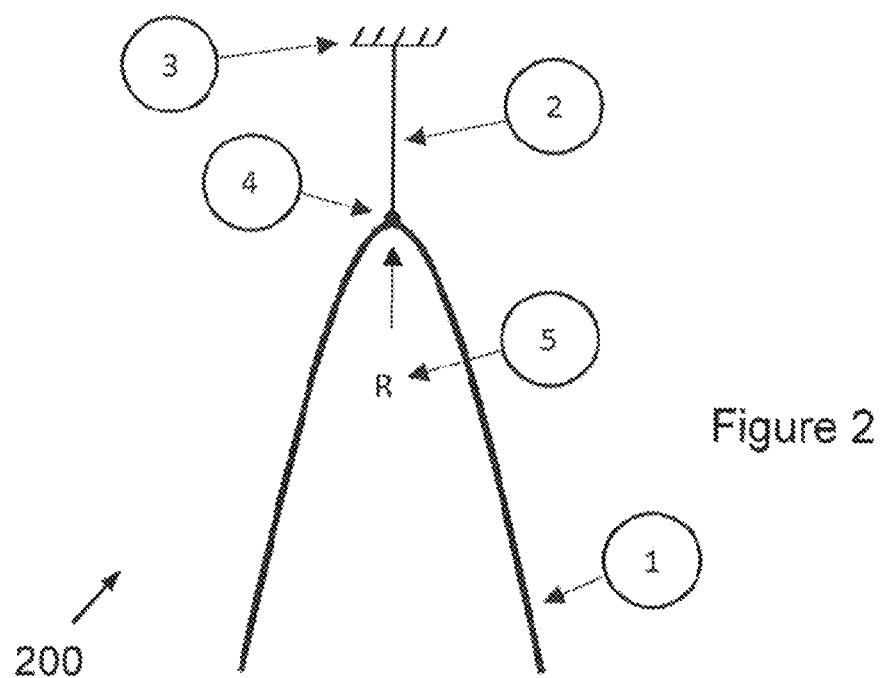
FIG. 2 shows a schematic illustration of an example of a lighting device.

FIG. 2 shows a schematic illustration of an example of a lighting device 200.

In this example, a flexible substrate 1 is suspended on a rope 2. The rope 2 is connected to the ceiling 3.

The rope 2 is attached, in this example, to the flexible substrate 1 via a connection point 4.

Due to natural gravity forces, the flexible substrate 1 is, in this example, bent by a radius R (5).

Figure 3B:
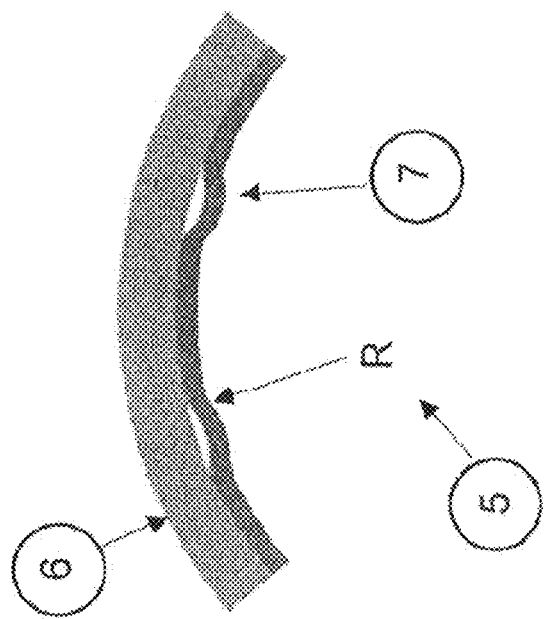
FIGS. 3a and b show schematic illustrations of a bent flexible lighting panel according to some example implementations as described herein.
Figure 3A:
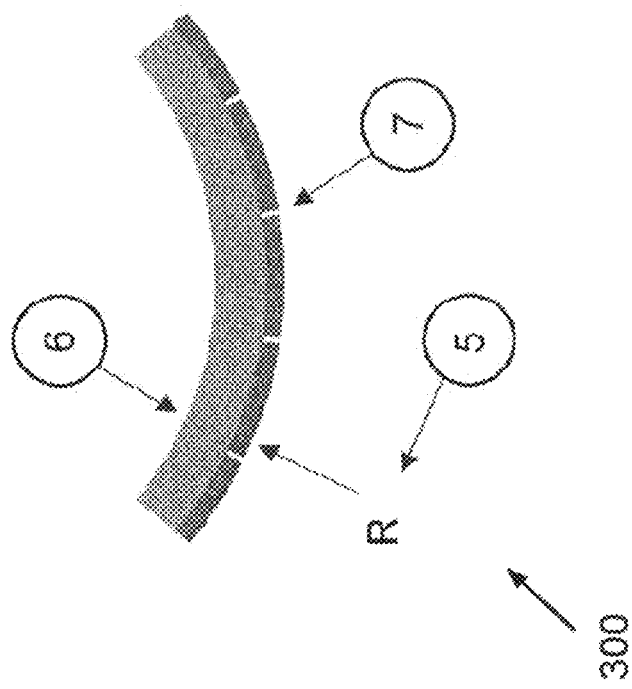

FIGS. 3a and b show schematic illustrations of a bent flexible lighting panel 300 according to some example implementations as described herein.

In FIG. 3a, a face-out bending is shown, which creates tension at the emitting layer 7, which is arranged on substrate layer 6. The face-out bending may result in cracks of the emitting layer 7.

In FIG. 3b, a face-in bending is shown, which creates compression of the emitting layer 7. The face-in bending may result in compression-related damages of the emitting layer 7.

The damages of the emitting layer 7 may occur if a certain value of R is exceeded. It may therefore be necessary, in some examples, to limit R in order to prevent any damages. Therefore, in some examples, a less flexible (stiffening) layer is added which may, in some examples, be made from a foam type material.

Figure 4:
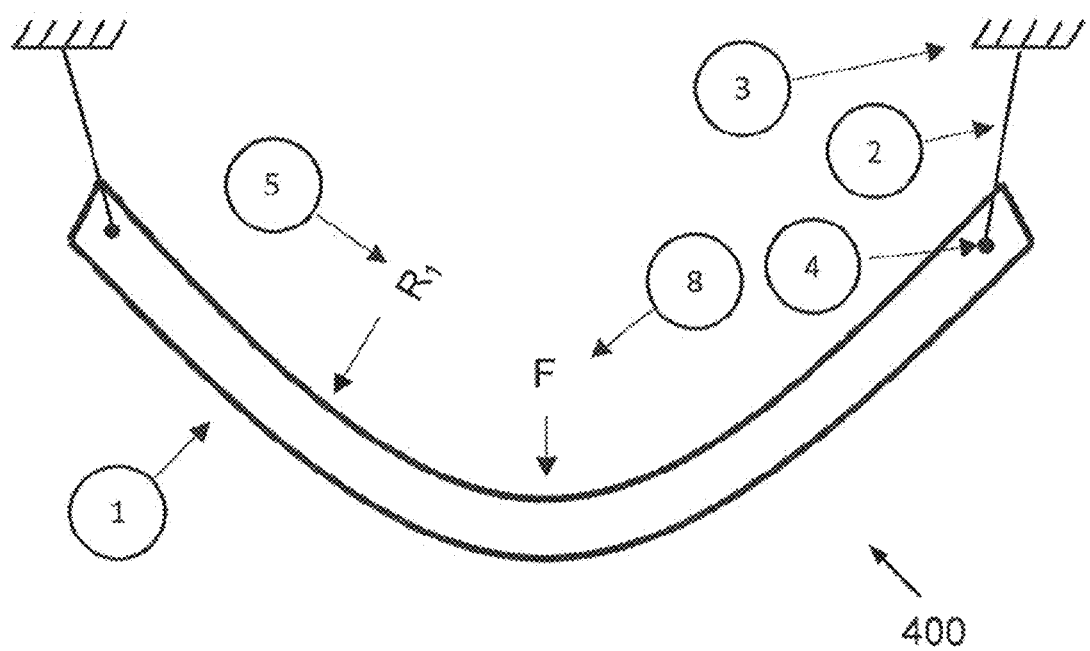
FIG. 4 shows a schematic illustration of an example of a lighting device.

FIG. 4 shows a schematic illustration of an example of a lighting device 400. In this example, a situation is shown in which the flexible lighting panel (substrate with less flexible layer) is suspended.

In this example the panel is suspended at two points. As a result of the suspension at two endpoints, the center of the panel is bent under gravity force F (8) until a certain level (R1: radius of bending). In this example, the radius R1 is larger than the minimum bending radius (below which damages may occur), which means that the flexible lighting panel may be bent even more if the gravity force F is increased further.

Figure 5:
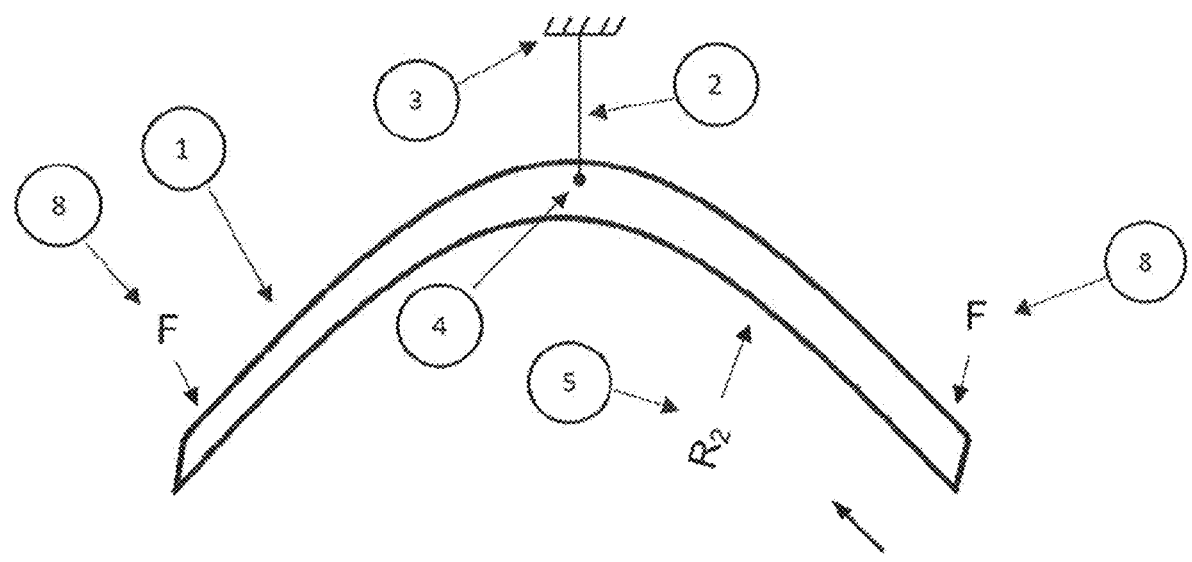
FIG. 5 shows a schematic illustration of a further example of a lighting device.

FIG. 5 shows a schematic illustration of a further example of a lighting device 500.

In this example, the flexible lighting panel is suspended at a single point. The flexible lighting panel will bend under gravity forces F (8) which are applied to the sides of the flexible lighting panel, resulting in a bending radius R2. In this example, the bending radius R2 is larger than the permissible bending radius below which any damages to the flexible lighting panel may occur. As a result, the flexible lighting panel may be bent further by adding additional forces to the sides of the flexible lighting panel without resulting in any damages to the flexible lighting panel.

FIGS. 6a to d show schematic illustrations of a lighting device 600 according to some example implementations as described herein.

Figure 6A:
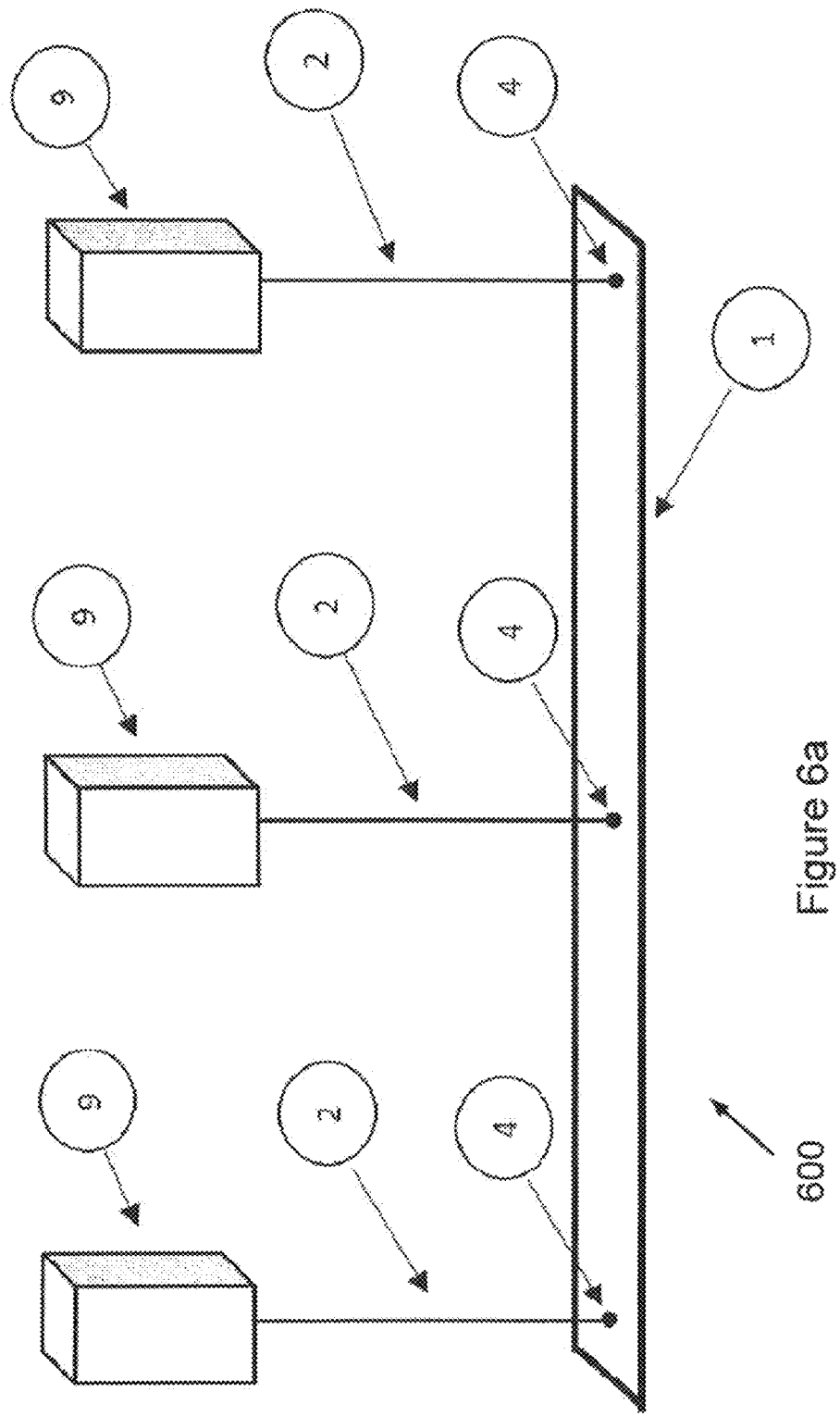

In this example, as shown in FIG. 6a, the flexible lighting panel 1 is suspended using three winches 9 by respective ropes 2 and connection points 4.

When the sides of the flexible lighting panel are lifted, the rope of the central winch may slack as it may not have enough load, as shown in FIG. 6b. The weight of the central winch rope may hereby not be enough in order to create an additional force which may be large enough in order to bend the flexible lighting panel as well.

The same may happen if the central part of the flexible lighting panel is lifted such that the side winches may have slack of ropes, as shown in FIG. 6c.

Figure 6D:
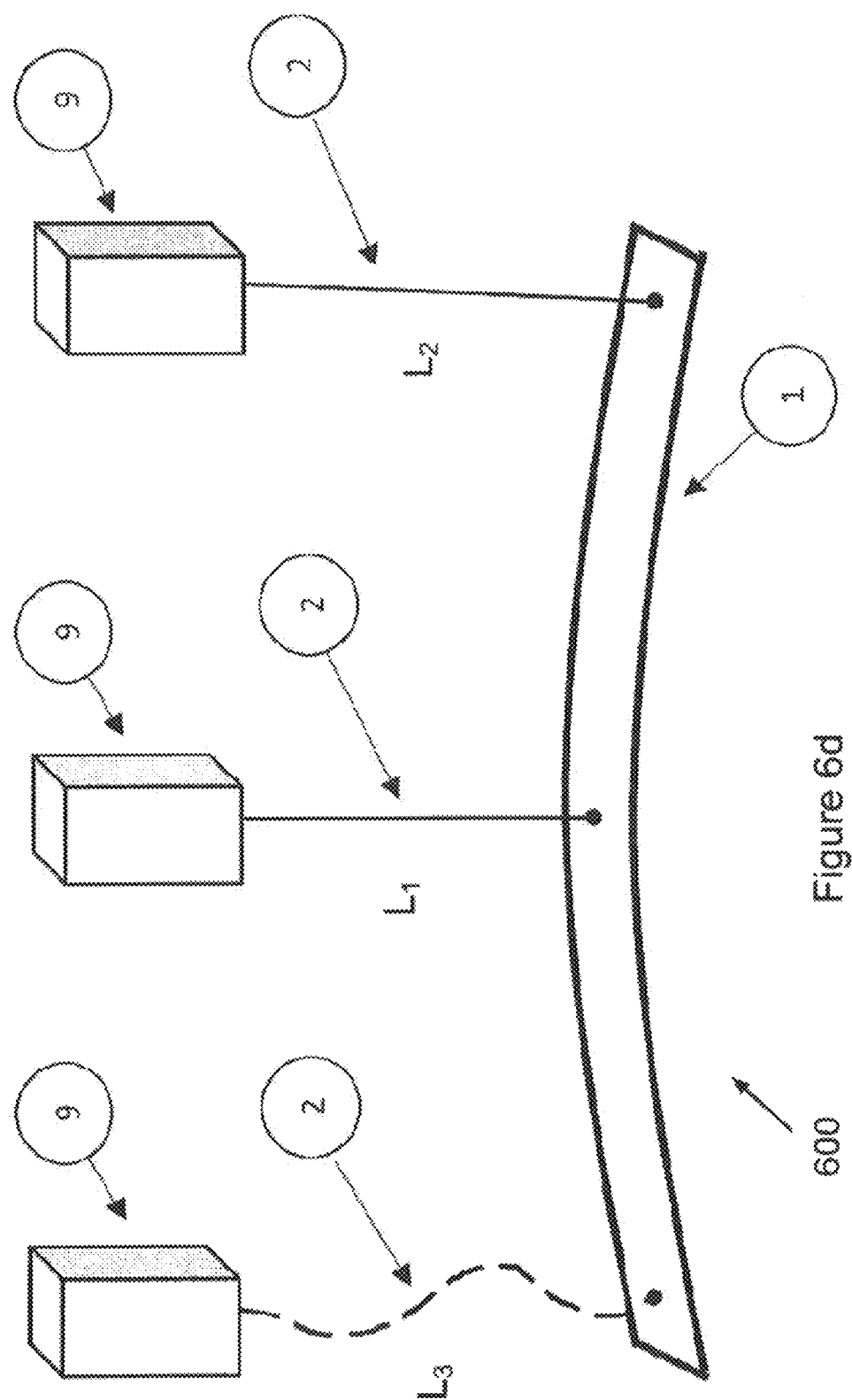

The same situation may occur if the central part and one of the sides of the flexible lighting panel are lifted, as shown in FIG. 6d.

Figure 7:
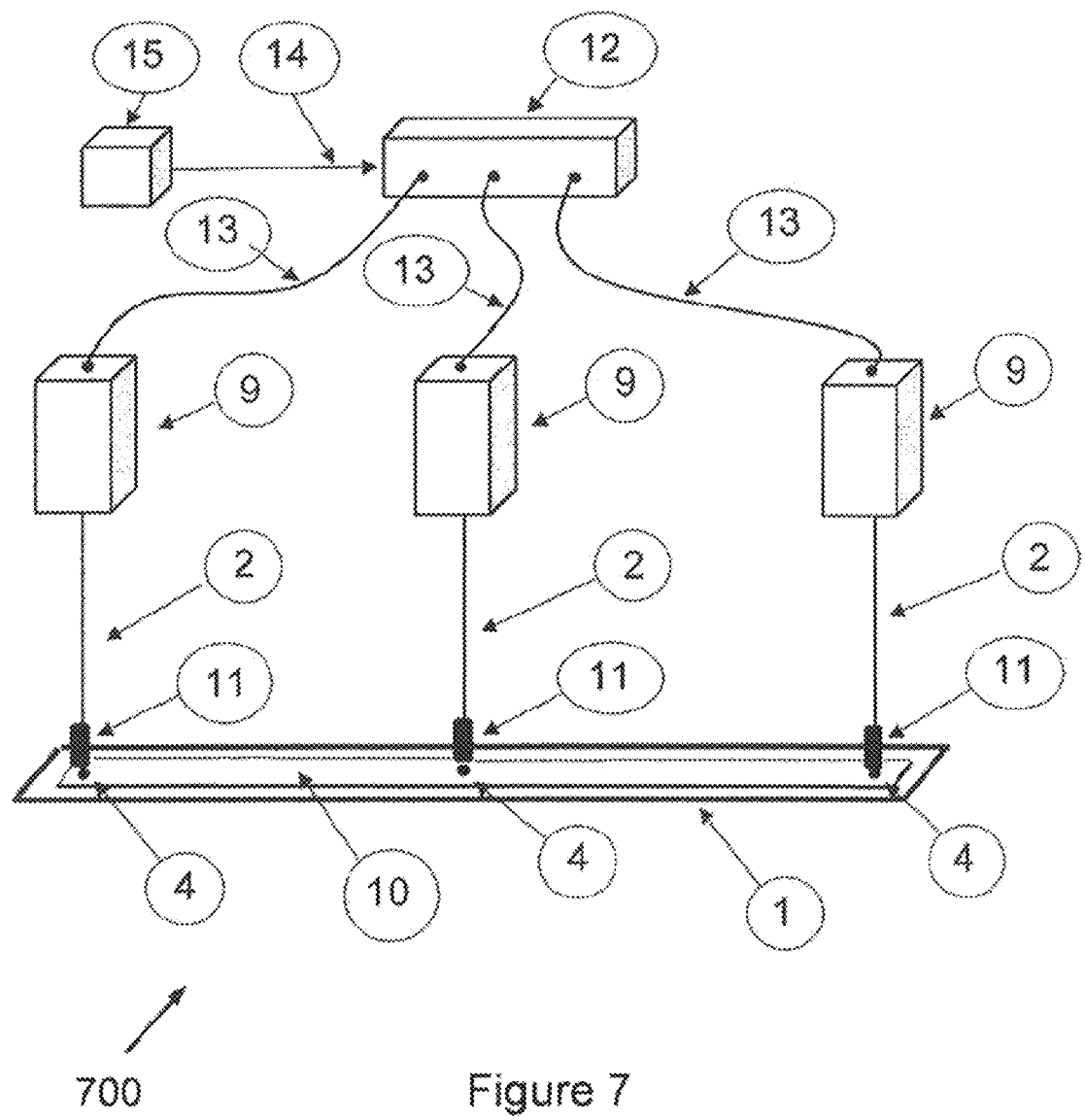
FIG. 7 shows a schematic illustration of a lighting device according to some example implementations as described herein.

In order to overcome the above problems, in some examples, additional weights 11 are added at each connection point, at the end of the respective rope, as shown in FIG. 7. Furthermore, in this example, the winches are connected to one common safety control device 12. It will be appreciated that different safety control devices may be exploited for each of the respective winches. Additionally, in this example, angle measurement means are added to each of the connection points at which the less flexible (stiffening) layer 10 is coupled, in this example, to the winches.

In this example, the safety control device 12 receives data via the input link 14 from the main controller 15. Data is processed and sent to each connected winch.

In this example, links 13 are provided between the safety control device and the winches. In this example, the links are bidirectional, so that the safety control device can send data to the winches and the winches can send data to the safety control device.

Figure 8:
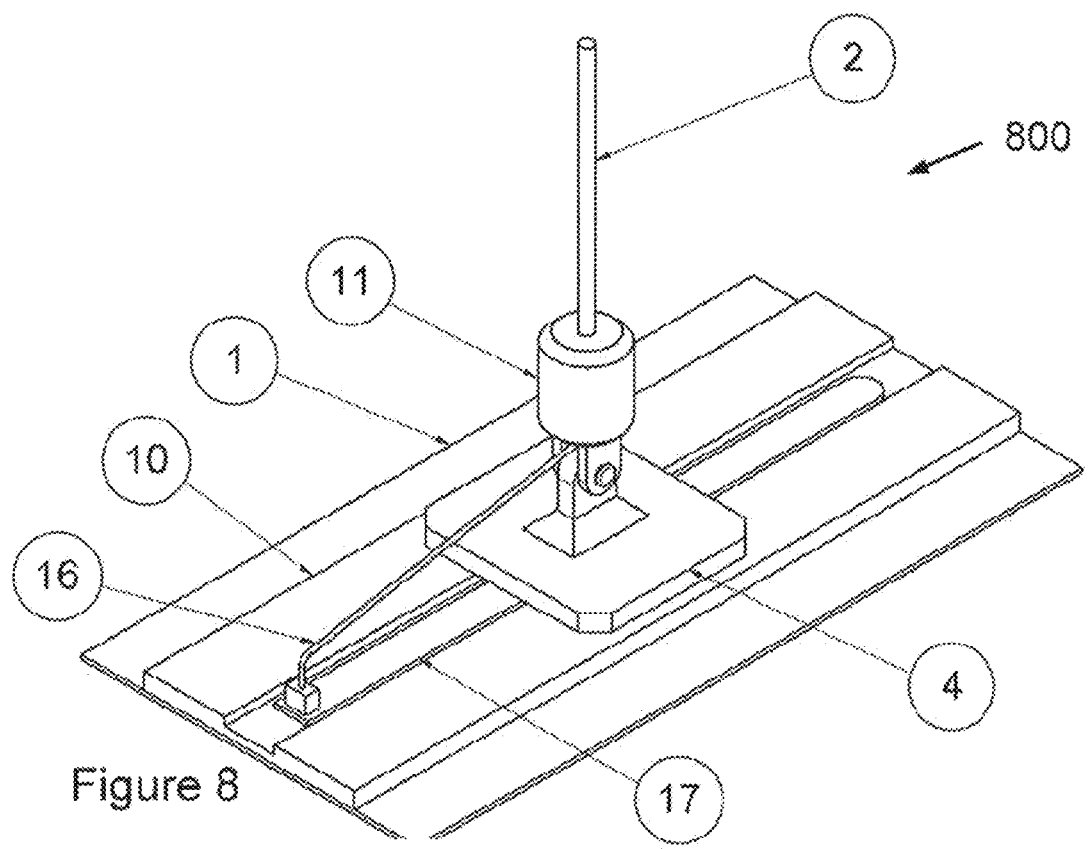
FIG. 8 shows a perspective view of a schematic illustration of parts of a lighting device according to some example implementations as described herein.

FIG. 8 shows a perspective view of a schematic illustration of parts of a lighting device 800 according to some example implementations as described herein.

In this example, at the end of the rope 2, a weight 11 is rotatably attached to the connection point 4. In this example, a connection point is attached firmly to the less flexible layer 10. The less flexible layer 10 is attached, in this example, to an OLED panel 1 (in this example glued).

In this example, the rope 2 has electrical wires 16 connected to the angle measurement means 17. The angle measurement means 17 is connected, in this example, to the less flexible layer 10 and may be placed on top of the less flexible layer 10 and/or inside of the less flexible layer 10, under the connection point 4.

The angle measurement means 17 may, in some examples, be a flex sensor which changes its resistance depending on the bending angle. Additionally or alternatively, the angle measuring means 17 may be a pan/tilt MEMS device, for example an inclinometer, which changes an output voltage as a function of the bending angle.

In any of the example implementations as described herein, an additional circuit may be provided in order to determine the resistance and/or the output voltage of the flex sensor. This circuit may, in some examples, be comprised in any one or more of the electrical circuits of the lighting device.

Figure 9:
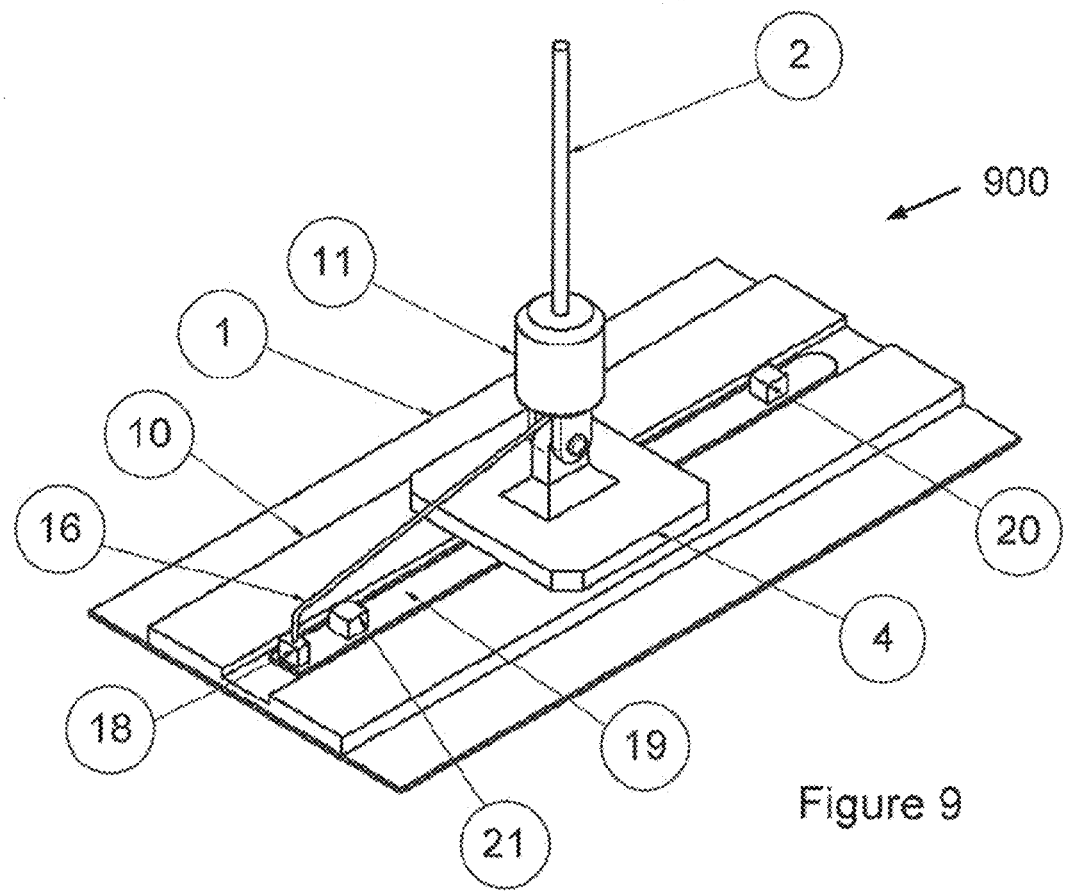
FIG. 9 shows a perspective view of a schematic illustration of parts of a lighting device according to some example implementations as described herein.

FIG. 9 shows a perspective view of a schematic illustration of parts of a lighting device 900 according to some example implementations as described herein.

In this example, the lighting device comprises a flexible PCB 19, a connector 18, a left sensor 21 and a right sensor 20. Information is output, in this example, to the winches via wires 16.

In some examples, the weight 11 can be used as a reference point in automated winches. The auto setup process may be performed if all angles are zero. This may mean that the load (panel) is in a flat position. If any of the angles is not zero, the corresponding winch may adjust it to be zero by moving up or down the panel until an angle of zero is reached.

Figure 10:
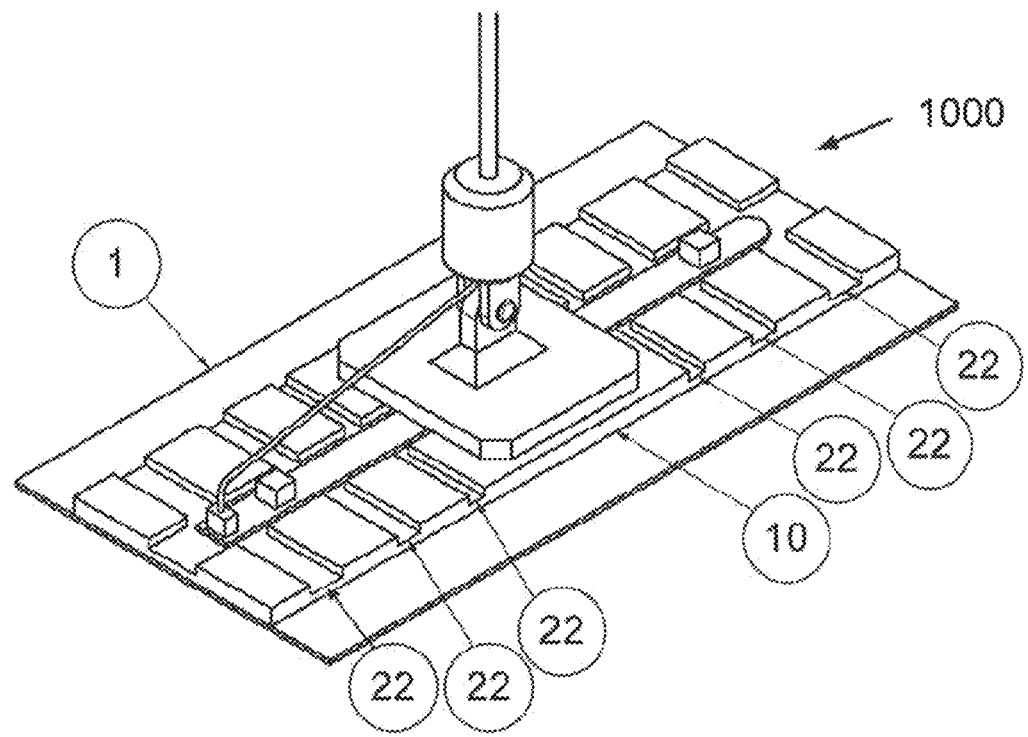
FIG. 10 shows a perspective view of a schematic illustration of parts of a lighting device according to some example implementations as described herein.

FIG. 10 shows a perspective view of a schematic illustration of parts of a lighting device 1000 according to some example implementations as described herein.

In this example, the permissible bending radius may be adjusted by adjusting the flexibility of the less flexible layer. In this example, the material is removed at certain locations and varying distances between the removal locations 22.

Figure 11:
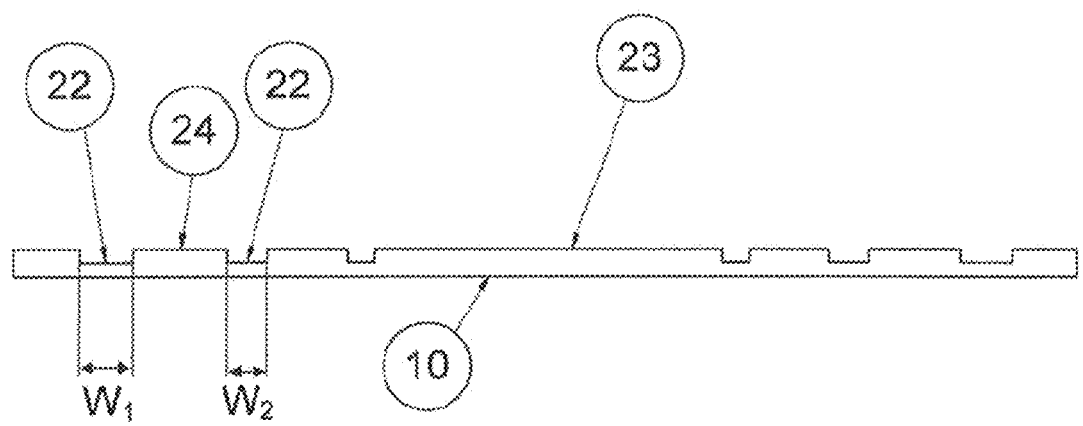
FIG. 11 shows a side view of a schematic illustration of a stiffening layer according to some example implementations as described herein.

FIG. 11 shows a side view of a schematic illustration of a stiffening layer according to some example implementations as described herein.

Shown are the less flexible layer with removal locations 22 (in this example in the form of recesses), a space 23 at which the material is not removed (so as to be used for a connection point 4), and distance 24 between the removal locations 22. By adjusting the width (W1 and/or W2) of the removal locations 22 and the distance 24 therebetween, the bending properties of the stiffening layer 10 can be controlled.

Figure 12:
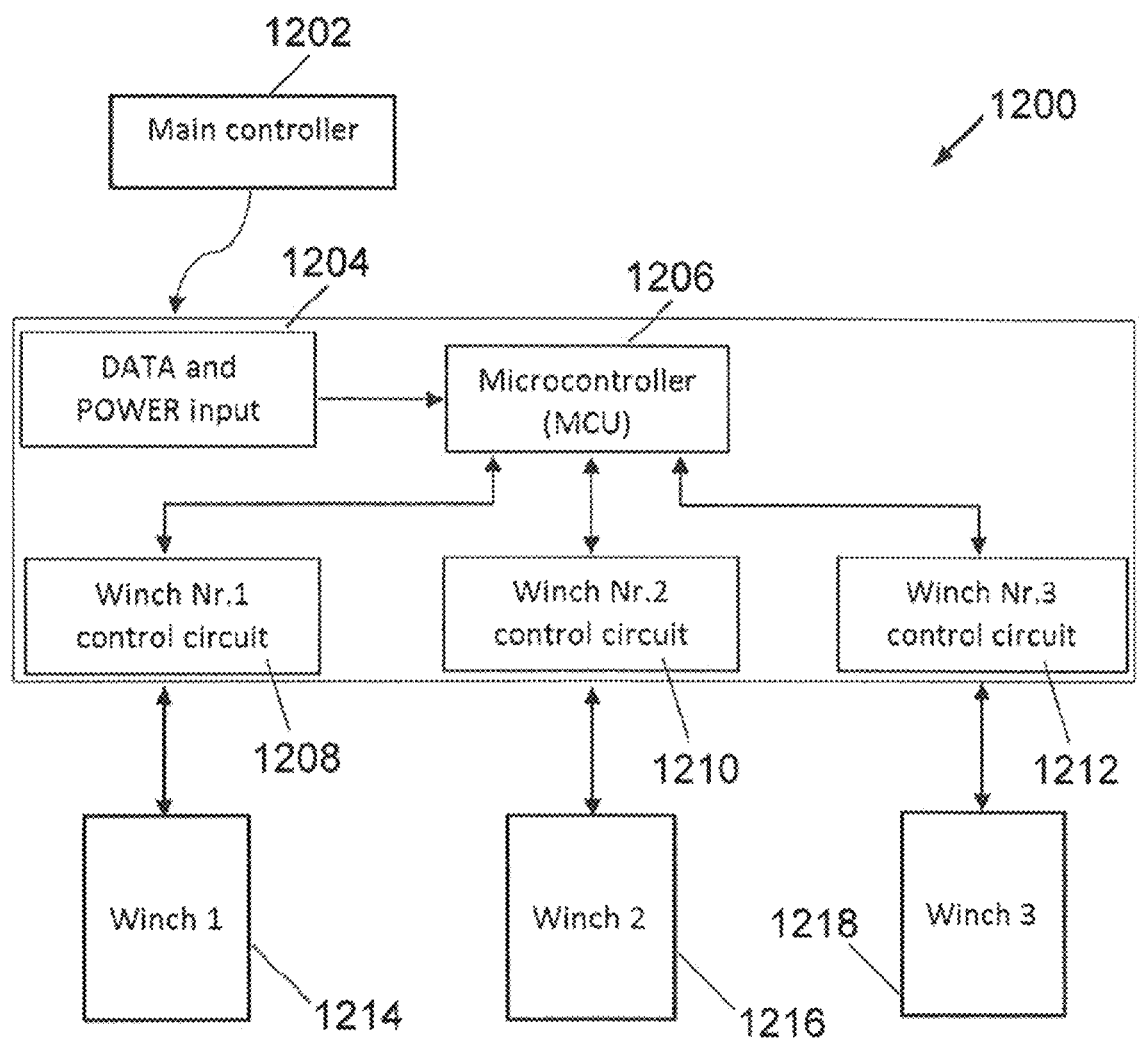
FIG. 12 shows a schematic block diagram of parts of a lighting device according to some example implementations as described herein.

FIG. 12 shows a schematic block diagram of parts of a lighting device 1200 according to some example implementations as described herein.

The safety control device consists, in this example, of input and output connectors (1204), a microcontroller 1206, and a number of winch control circuits 1208, 1210 and 1212 for winches 1214, 1216 and 1218.

The data and power input 1204 is coupled to the main controller 1202.

The main control data is sent, in this example, by the lighting controller.

The safety control device receives the control data, the microcontroller 1206 processes the control data and sends it to the winches 1214, 1216 and 1218 through the winch control circuits 1208, 1210 and 1212 to the respective winches.

In this example, the winch control circuits 1208, 1210 and 1212 also receive data from the respective winches 1214, 1216 and 1218.

Figure 13:
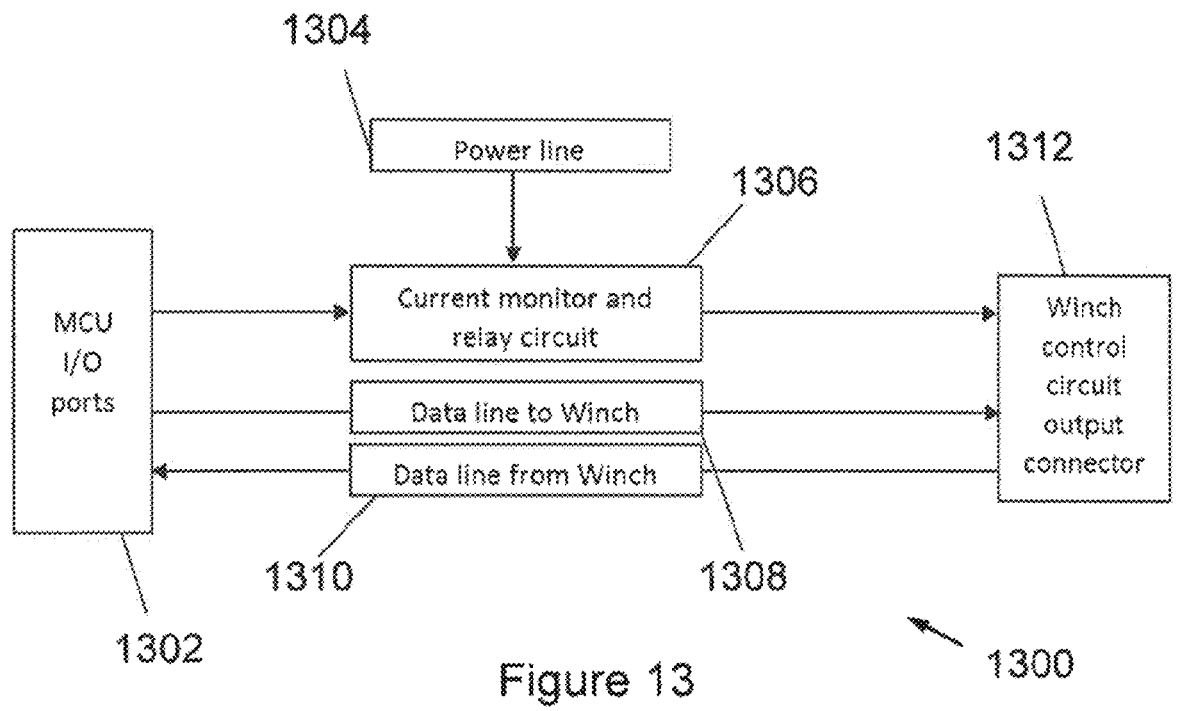
FIG. 13 shows a schematic block diagram of a winch control circuit according to some example implementations as described herein.

FIG. 13 shows a schematic block diagram of a winch control circuit 1300 according to some example implementations as described herein.

In this example, the power line 1304 is coupled to the current monitor and relay circuit 1306. The MCU I/O ports 1302 are coupled to the current monitor and relay circuit 1306, the data line to winch 1308 and the data line from winch 1310. The current monitor and relay circuit 1306 is coupled to the winch control circuit output connector 1312. The data line to winch 1308 is equally coupled to the winch control circuit output connector 1312. The winch control circuit output connector 1312 is coupled to the data line from winch 1310.

The winch control circuit is, in this example, part of the safety control device and performs the following functions.

In this example, the winch control circuit supplies power to the winch. It further monitors the current consumed by the winch and disables power in case of an overcurrent or in another emergency situation. It detects that the winch is connected to the safety control device, which may be necessary, in some examples, in order to count the number of winches connected to the safety control device. This data may be used by the MCU for data processing. The winch control circuit further sends, in this example, data to the winch and receives data from the winch.

Figure 14:
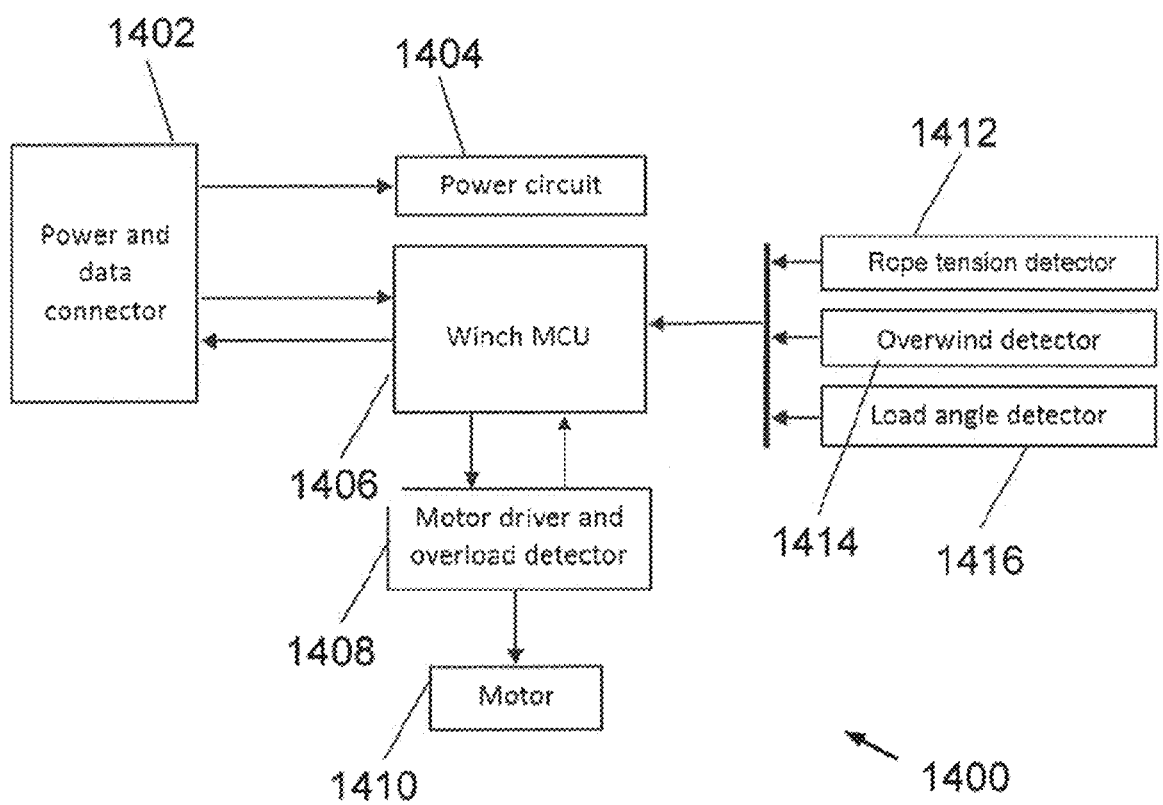
FIG. 14 shows a schematic block diagram of a winch according to some example implementations as described herein.

FIG. 14 shows a schematic block diagram of a winch 1400 according to some example implementations as described herein.

In this example, the winch 1400 comprises a power and data connector 1402 which is coupled to a power circuit 1404. The power and data connector 1402 is coupled to the winch MCU 1406. The winch MCU 1406 is coupled to the motor driver and overload detector 1408. The motor driver and overload detector 1408 is coupled to the motor 1410 of the winch 1400.

Furthermore, in this example, the rope tension detector 1412, the overwind detector 1414 and the load angle detector 1416 are each coupled to the winch MCU 1406.

In this example, the winch receives data and power from the safety control device. The safety control device data contains position and checksum data.

In some examples, the winch may send several data (status) to the safety control device. This data may comprise one or more of auto setup status relating to data when the auto setup is performed, winch fail status in case of any fails, such as, for example, a motor overload and/or a rope slack and/or overwinding, and angle fail status in case of reaching a certain angle value or the value being within a certain range from the angle sensor(s) (which may be located at the load).

After powering up, the winch may need to determine its start position. This procedure may be referred to as auto setup. The winch may roll up its rope until it reaches, for example, the weight 11. Afterwards, the winch may move the load to a particular position according to data received from the safety control device.

Additionally or alternatively, it may also be possible to determine the start position by measuring angles via the sensors 17, 20 and 21. The rope may be rolled up or down until the angle is zero as measured via the sensor(s). The panel 1 is hereby in a horizontal position.

Figure 15:
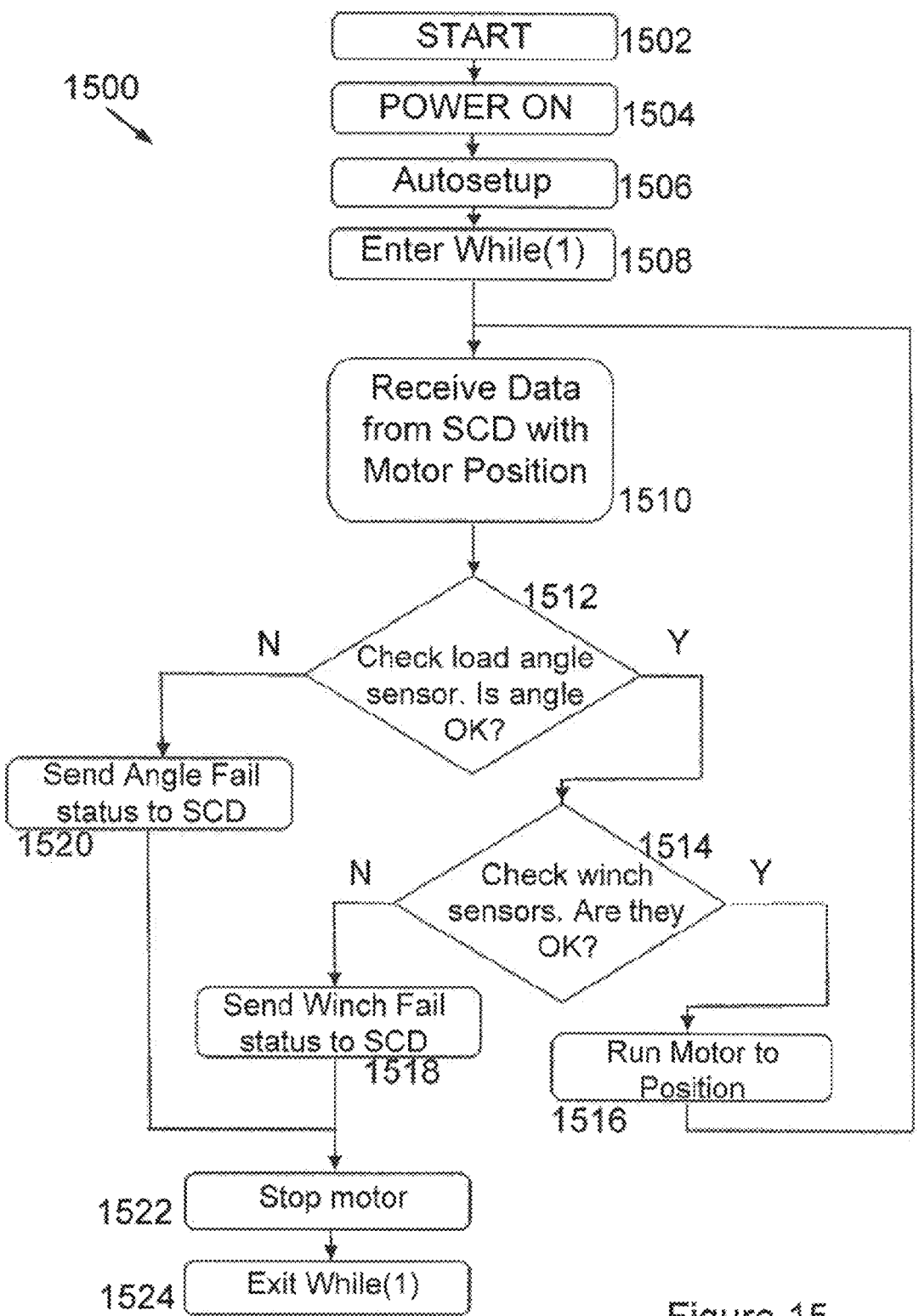
FIG. 15 shows a flow diagram of a method according to some example implementations as described herein.

FIG. 15 shows a flow diagram of a method 1500 according to some example implementations as described herein.

The method 1500 relates to an algorithm of winch firmware. The method starts at step 1502. After power on at step 1504, the winch enters, in this example, an auto setup routine at step 1506. When the auto setup has been completed, the program goes into the main while(1) cycle at step 1508.

At step 1510, the winch receives data from the safety control device with motor position information.

At step 1512, the load angle sensor(s) is (are) checked. If it is determined that the angle(s) is (are) not within a permissible range, an angle fail status is sent at step 1520 to the safety control device. Thereafter, at step 1522, the motor is stopped and at step 1524, the while(1) program is exited.

If the angle(s) is (are) determined at step 1512 to be within the permissible range, the winch sensors are checked. If they are OK (e.g. operating correctly and/or no overwinding state), the winch motor is run to a predefined position at step 1516. The winch may also send angle data to the safety control device, and the safety control device may perform certain calculations, so as, for example, to adjust other winch positions based on angle data from other winches.

If the winch sensors are not OK, as may be determined at step 1514, winch fail status is sent to the safety control device at step 1518. Thereafter, the motor of the winch is stopped at step 1522 and the program while(1) is exited at step 1524.

Figure 16:
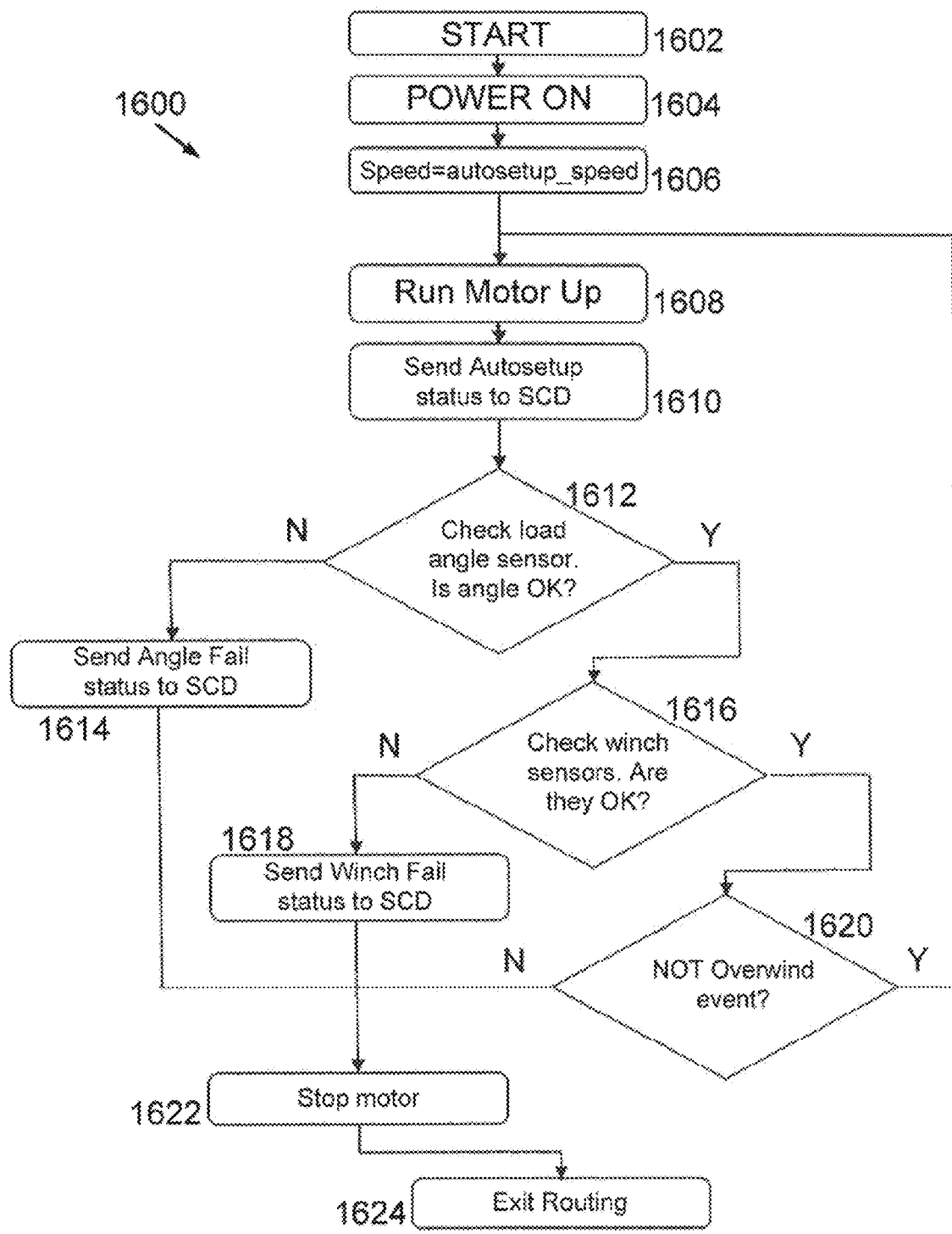
FIG. 16 shows a flow diagram of a method according to some example implementations as described herein.

FIG. 16 shows a flow diagram of a method 1600 according to some example implementations as described herein.

The method incorporates an auto setup routine. During this routine, the winch may, in some examples, constantly send auto setup status data to the safety control device.

The method incorporates an auto setup routine. During this routine, the winch may, in some examples, constantly send auto setup status data to the safety control device.

Then, at step 1606, the speed of the winch is set.

At step 1608, the motor of the winch is run up and the auto setup status is sent to the safety control device at step 1610.

At step 1612, the load angle sensor is (are) checked. If the angle(s) is (are) not within a permissible range, angle fail status is sent at step 1614 to the safety control device. Thereafter, the motor is stopped at step 1622 and the routine is exited at step 1624.

If it is determined at step 1612 that the angle(s) is (are) within the permissible range, the winch sensors are checked at step 1616 (e.g. operating correctly and/or no overwinding state). If one or more of the winches show a failure, winch fail status is sent to the safety control device at step 1618. Thereafter, the motor is stopped at step 1622 and the routine is exited at step 1624.

If all winches are operating correctly, it is determined at step 1620 if an overwinding event has not occurred. If an overwinding event occurred (N), the motor is stopped at step 1622 and the routine is exited at step 1624.

If no overwinding event occurred (Y), as determined at step 1620, the procedure continues with step 1608.

Figure 17:
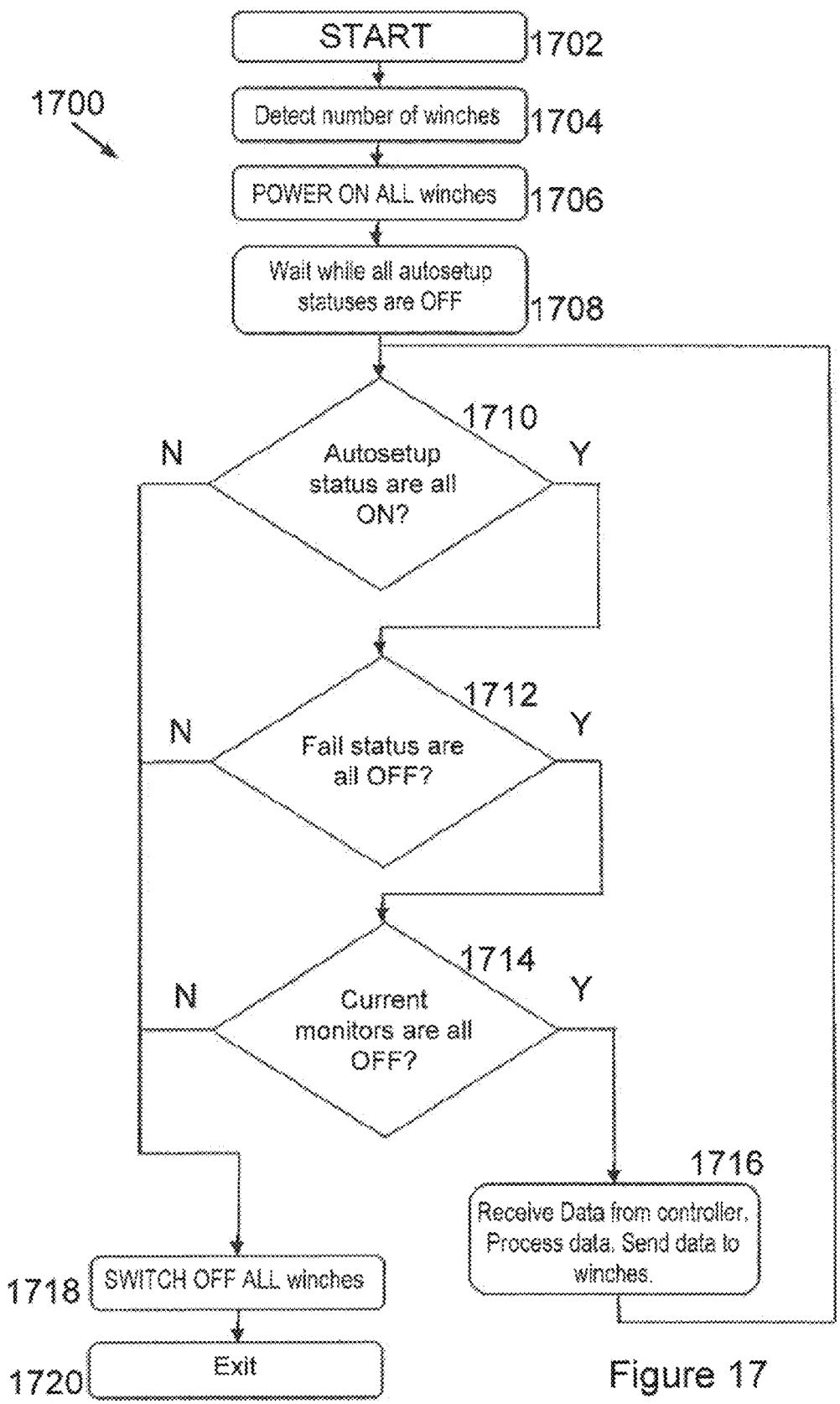
FIG. 17 shows a flow diagram of a method according to some example implementations as described herein.

FIG. 17 shows a flow diagram of a method 1700 performed by the safety control device according to some example implementations as described herein.

With the routine depicted in FIG. 17, it may be determined how the safety control device is working.

In this example, the method starts at step 1702, after which at step 1704, the number of winches is detected by the safety control device.

At step 1706, all winches are powered on.

At step 1708, the safety control device waits while all auto setup statuses are off.

It is then determined, at step 1710, if all auto setup statuses are on. If not, all winches are switched off at step 1718 and the program is exited at step 1720.

If all auto setup statuses are on, it is determined at step 1712 if all fail statuses are off (i.e. if no failures occur). If not, all winches are switched off at step 1718 and the program is exited at step 1720.

If all fail statuses are off, it is determined at step 1714 if all current monitors are off. A current monitor being off may hereby relate to no overconsumption of current occurring. If not, all winches are switched off at step 1718 and the program is exited at step 1720.

If all current monitors are off, the safety control device receives data from the controller at step 1716. The safety control device processes the data and sends the data to the winches.

The safety control device enters into a loop in this case and continues with step 1710 as described above.

As outlined above, after power on, the safety control device detects the number of connected winches. Then, the safety control device powers on the connected winches by, in this example, switching on relays for corresponding winch control circuits.

The winches enter the auto setup routine and start sending auto setup status to the safety control device. The safety control device waits for completion of the auto setup routines of all connected winches.

Then, the safety control device may enter its main routine, which comprises one or more of:

Checking if any of the winches sends auto setup status after completion of a previous auto setup procedure. This may mean that the winch may have suddenly restarted for an unknown reason. In such an emergency situation, all winches may need to be switched off to avoid any damage of the load.

Checking if any fail status is received. Again, this may be an emergency situation and all winches may need to be switched off to avoid damage of the load.

Checking current monitors of winch control circuits and, in case of a failure, switching off all winches in order to avoid damage of the load.

If no emergency situations occur, the safety control device receives data from the main controller, processes it and sends it to the winches. The processing of data may also include processing of angle data received from the winches.

Figure 18A:
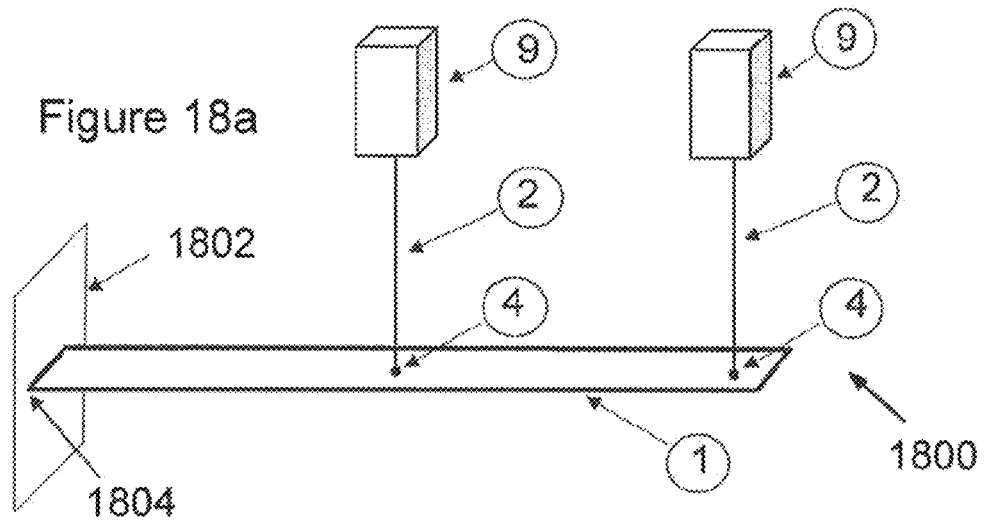
FIGS. 18a to c show schematic illustrations of a lighting device according to some example implementations as described herein.
Figure 18B:
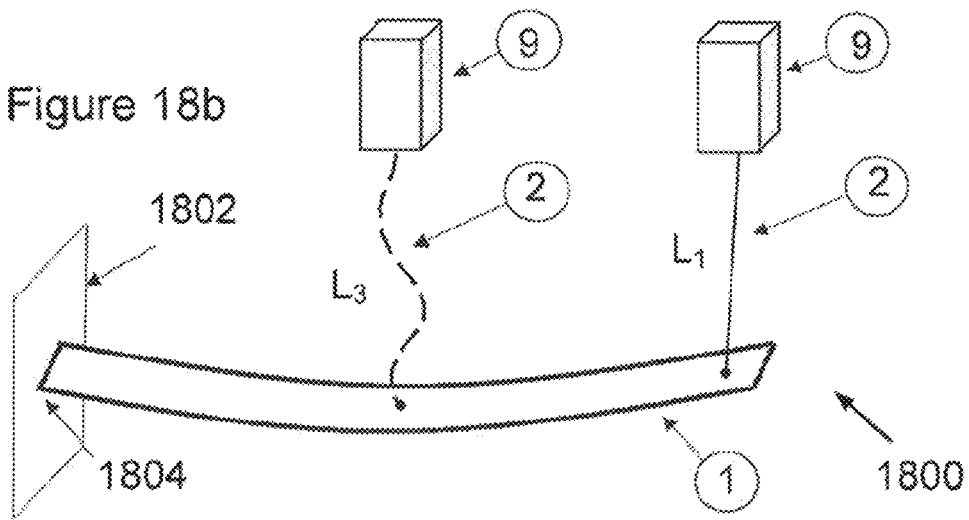
Figure 18C:
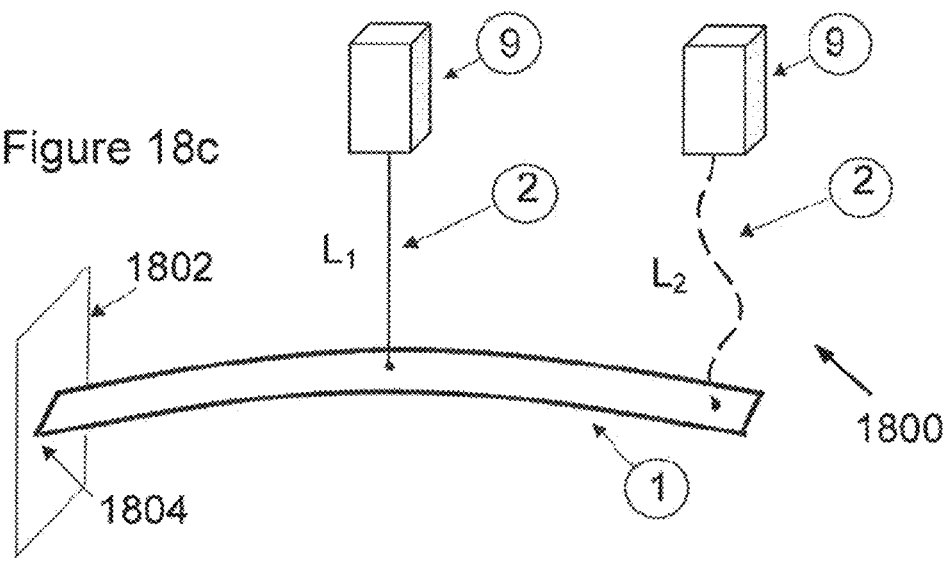

FIGS. 18a to c show schematic illustrations of a lighting device 1800 according to some example implementations as described herein.

In this example, one end of the flexible lighting panel is attached to a static object 1802, such as, but not limited to a wall or a support structure which may, in some examples, hold the winches. The attachment 1804 of the flexible lighting panel to the wall or support structure may be rotatable or firmly fixed.

In this example, the flexible lighting panel 1 is suspended using two winches 9 by respective ropes 2 and connection points 4, and one side of the flexible lighting panel is attached to the static object 1802 via the attachment 1804.

When the side of the flexible lighting panel which is not attached to the static object 1802 is lifted, the rope of the central winch may slack as it may not have enough load, as shown in FIG. 18b. The weight of the central winch rope may hereby not be enough in order to create an additional force which may be large enough in order to bend the flexible lighting panel as well.

The same may happen if the central part of the flexible lighting panel is lifted such that the side winch on the side of the flexible lighting panel which is not attached to the static object 1802 may have a slack of rope, as shown in FIG. 18c.

The safety control device and measuring unit used to measure the bending angle and/or bending radius may also be used in other applications, for example in ones in which a square or triangle shaped flexible lighting panel (for example OLED flexible lighting panel) is used. In such examples, a stiffening layer may be used which may be provided from the center of the flexible lighting panel to the respective corners of the flexible lighting panel (for example in the direction of bending).

Figure 19:
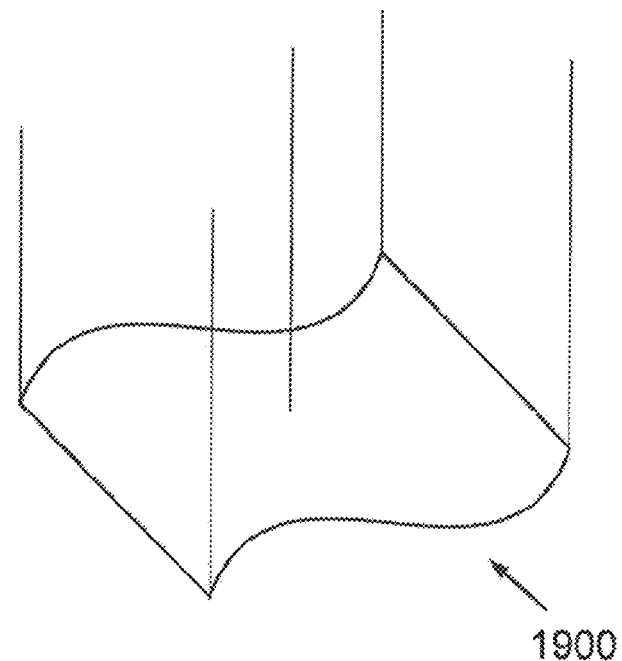
FIG. 19 shows a schematic illustration of a lighting device according to some example implementations as described herein.

FIG. 19 shows a schematic illustration of a lighting device 1900 according to some example implementations as described herein.

In this example, a square flexible OLED lighting panel is used.

A plurality of winches, for example four or more winches may be used per flexible lighting panel in order to bend the flexible lighting panel.

In some examples, four or more winches are used per flexible, square lighting panel, whereby, in some examples, the center of the flexible lighting panel may be kept at a fixed position. The four corners of the flexible lighting panel may be bent in and out.

In examples in which the center of the flexible lighting panel is suspended on a rope (which is not part of a winch) or a winch rope, an additional weight may be arranged at a center position and/or the corners/corner regions of the flexible lighting panel.

In some examples, the flexible lighting panel comprises a triangular-shaped flexible lighting panel. The triangular-shaped flexible lighting panel may be coupled, for example, to three or more winches. The center position of the flexible lighting panel may hereby be fixed. In some examples, weights may be arranged at the corners or corner regions, and, in some examples, additionally in the center of the flexible lighting panel if a fourth winch is being exploited.

In these examples, the safety control device according to example implementations as described herein for coordinated movement of the square or triangular-shaped flexible lighting panel(s) may be used. The movement of the flexible lighting panel may hereby mimic, for example, a "flying bird" movement.

Figure 20:
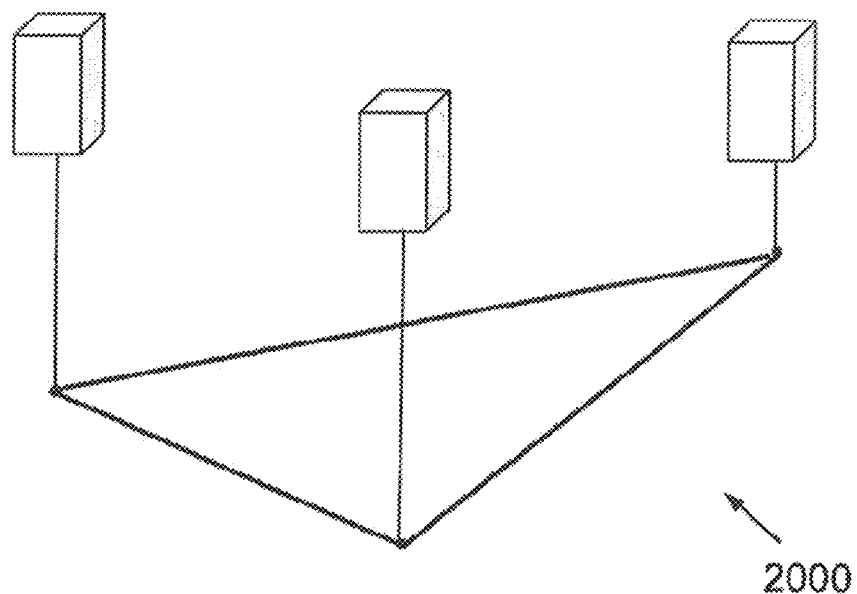
FIG. 20 shows a schematic illustration of a lighting device according to some example implementations as described herein.

FIG. 20 shows a schematic illustration of a lighting device 2000 according to some example implementations as described herein.

In this example, three winches share the same load. They are, in this example, daisy-chained such that the power and signals (for example, signals carrying data identifying the winding state of the respective winch) may go from the first winch to the second winch, from the second winch to the third winch, and so on.

In some examples, the load may hereby not be flexible.

There may be situations in which one of the winches may stop working, while one or more of the other winches continue working so as to change the location of the load at the respective point(s) at which the winch(es) is (are) attached to the load. As a result, slack of cable/rope, overload of a winch, and/or possible damage of the load may occur. Therefore, even if only two winches may be exploited in some examples, these winches may need to be coordinated in movement so as to prevent these emergency situations. Hence, the safety control device may be used in these example implementations in order to prevent these emergency situations and/or react accordingly when such an emergency situation occurs.

Figure 21:
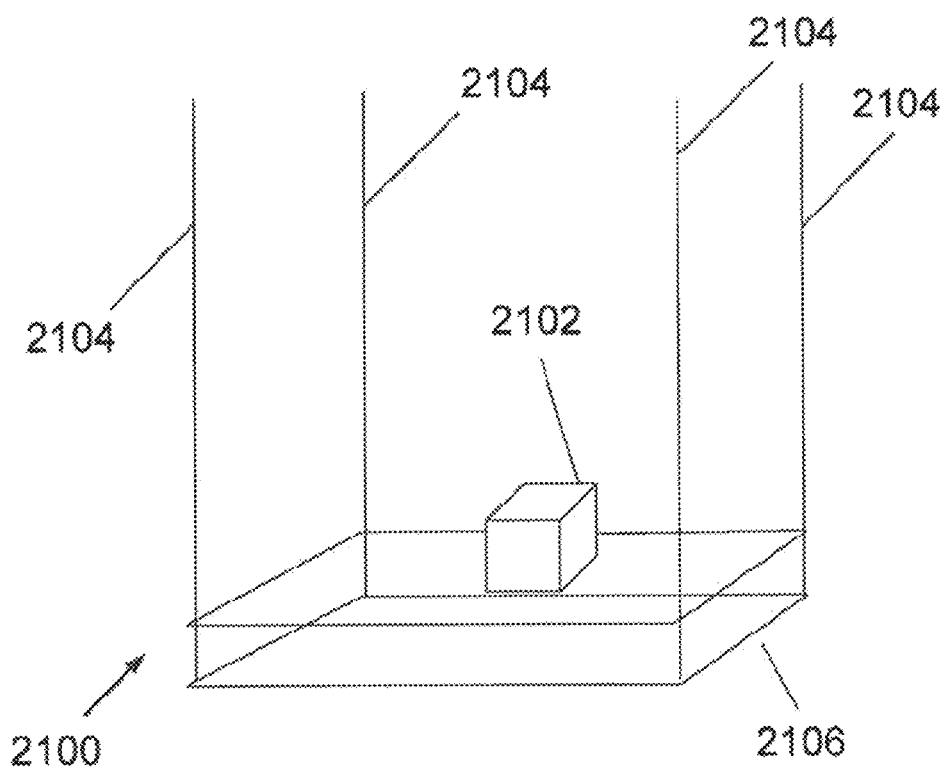
FIG. 21 shows a schematic illustration of a lighting device according to some example implementations as described herein.

FIG. 21 shows a schematic illustration of a lighting device 2100 according to some example implementations as described herein.

In this example, the load comprises a window shell 2106 which may be used, for example, for demonstrating an object 2102. In this example, the winches are not shown in full, but only the respective ropes 2104 are displayed.

As any objects arranged on the window shell may be freestanding, if any of the winches stops while one or more of the other winches continue working, the objects may fall from the window shell. This may also be the case for situations in which an object is glued or fixed to the window shell. Hence, the safety control device according to any one or more of the example implementations as described herein may be used in order to prevent these situations in which an object may fall.

No doubt many other effective alternatives will occur to the skilled person. It will be understood that the invention is not limited to the described embodiments and encompasses modifications apparent to those skilled in the art and lying within the scope of the claims appended hereto.

What is claimed is:

1. A lighting device comprising: a flexible lighting panel; a plurality of winches coupled at different, respective locations to the flexible lighting panel; and one or more controllers configured to control the winches to raise and/or lower the flexible lighting panel at one or more of the different, respective locations to generate a wave-like movement of the flexible lighting panel; a safety control device coupled to the plurality of winches and the one or more controllers, wherein the safety control device is configured to receive, from the winches, status data relating to one or more of a setup process status, a winch current consumption status, a winch fail status, a bending angle fail status and a bending radius fail status, and wherein, when the status data satisfies a predefined condition, the safety control device is configured to: control one or more of the winches to stop raising and/or lowering the flexible lighting panel, and/or prevent the flexible lighting panel from being raisable and/or lowerable by one or more of the winches, and/or disable and/or switch off power supply to one or more of the winches.

2. The lighting device as claimed in claim 1, wherein the flexible lighting panel comprises an elongated flexible lighting panel, and wherein the different, respective locations are spaced apart from each other in a direction generally parallel to a long axis of the elongated flexible lighting panel.

3. The lighting device as claimed in claim 1, wherein the flexible lighting panel is coupled to or comprises a stiffening layer configured to reduce a flexibility of the flexible lighting panel.

4. The lighting device as claimed in claim 3, wherein the stiffening layer comprises one or more recesses.

5. The lighting device as claimed in claim 3, wherein the stiffening layer comprises a foam.

6. The lighting device as claimed in claim 3, further comprising a measuring unit configured to measure a bending radius and/or bending angle of the flexible lighting panel.

7. The lighting device as claimed in claim 6, wherein the measuring unit is arranged within or on the stiffening layer, and wherein the measuring unit is configured to measure a bending radius and/or bending angle of the stiffening layer, and wherein the measuring unit is configured to measure the bending radius and/or bending angle of the flexible lighting panel based on the measured bending radius and/or bending angle of the stiffening layer.

8. The lighting device as claimed in claim 6, wherein the measuring unit comprises a sensor configured to measure the bending radius and/or bending angle based on the sensor changing its resistance and/or an output voltage depending on a bending angle of the sensor.

9. The lighting device as claimed in claim 6, wherein the measuring unit is in communication with the one or more controllers for communicating the bending radius of the flexible lighting panel to the one or more controllers, and wherein, when the bending radius of the flexible lighting panel is at a specific value or within a specific range of values, the one or more controllers are configured to (i) adjust a position of one or more of the winches, and/or (ii) stop and/or prevent starting said movement of the flexible lighting panel.

10. The lighting device as claimed in claim 1, further comprising a plurality of weights, wherein each of the weights is arranged at an end portion of a rope of a corresponding, respective one of said winches, wherein a said winch is coupled to the flexible lighting panel via a said end portion of the corresponding, respective rope.

11. The lighting device as claimed in claim 6, wherein the one or more controllers are configured to perform a setup process for each of the winches based on a position of two or more of the winches.

12. The lighting device as claimed in claim 11, wherein the one or more controllers are further configured to perform the setup process only when the bending angle is zero and/or when the flexible lighting panel is in a horizontal position.

13. The lighting device as claimed in claim 1, wherein, when the safety control device receives said status data relating to the setup process status after completion of an initial setup process, the safety control device is configured to perform one or more of said controlling, preventing and disabling, and/or wherein the safety control device is configured to detect a number of winches upon coupling of the winches to the safety control device, and wherein the one or more controllers are configured to control the winches using data indicative of the number of winches.

14. A lighting device comprising:
a lighting panel;
a plurality of winches coupled at different, respective locations to the lighting panel;
one or more controllers configured to control the winches to raise and/or lower the lighting panel at one or more of the different, respective locations; and
a safety control device coupled to the plurality of winches and the one or more controllers, wherein the safety control device is configured to receive, from the winches, status data relating to one or more of a setup process status, a winch current consumption status, a winch fail status, a winch winding status, and wherein, when the status data satisfies a predefined condition, the safety control device is configured to:
control one or more of the winches to stop raising and/or lowering the lighting panel, and/or
prevent the lighting panel from being raisable and/or lowerable by one or more of the winches, and/or
disable and/or switch off power supply to one or more of the winches.

* * * * *